US012069302B2

United States Patent
Boyce et al.

(10) Patent No.: US 12,069,302 B2
(45) Date of Patent: Aug. 20, 2024

(54) TEXTURE BASED IMMERSIVE VIDEO CODING

(71) Applicant: Intel Corporation, Santa Clara, CA (US)

(72) Inventors: Jill Boyce, Portland, OR (US); Basel Salahieh, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 17/918,859

(22) PCT Filed: Dec. 23, 2020

(86) PCT No.: PCT/US2020/066944
§ 371 (c)(1),
(2) Date: Oct. 13, 2022

(87) PCT Pub. No.: WO2021/211173
PCT Pub. Date: Oct. 21, 2021

(65) Prior Publication Data
US 2023/0247222 A1 Aug. 3, 2023

Related U.S. Application Data

(60) Provisional application No. 63/009,356, filed on Apr. 13, 2020.

(51) Int. Cl.
*H04N 19/597* (2014.01)
*G06T 7/50* (2017.01)
(Continued)

(52) U.S. Cl.
CPC .......... *H04N 19/597* (2014.11); *G06T 7/50* (2017.01); *G06V 10/54* (2022.01); *G06V 10/761* (2022.01);
(Continued)

(58) Field of Classification Search
None
See application file for complete search history.

(56) References Cited

U.S. PATENT DOCUMENTS

2012/0288015 A1* 11/2012 Zhang .................. H04N 19/152
375/240.26
2019/0156502 A1 5/2019 Lee et al.
(Continued)

OTHER PUBLICATIONS

International Searching Authority, "International Preliminary Report on Patentability," issued in connection with International Patent Application No. PCT/US2020/066944, mailed Oct. 27, 2022, 7 pages.
(Continued)

*Primary Examiner* — Xiaolan Xu
(74) *Attorney, Agent, or Firm* — Hanley, Flight & Zimmerman, LLC

(57) ABSTRACT

Methods, apparatus, systems and articles of manufacture for texture based immersive video coding are disclosed. An example apparatus includes a correspondence labeler to (i) identify first unique pixels and first corresponding pixels included in a plurality of pixels of a first view and (ii) identify second unique pixels and second corresponding pixels included in a plurality of pixels of a second view; a correspondence patch packer to (i) compare adjacent pixels in the first view and (ii) identify a first patch of unique pixels and a second patch of corresponding pixels based on the comparison of the adjacent pixels and the correspondence relationships, the second patch of corresponding pixels tagged with a correspondence list identifying corresponding patches in the second view; and an atlas generator to generate at least one atlas to include in encoded video data, the encoded video data not including depth maps.

25 Claims, 20 Drawing Sheets

(51) Int. Cl.
  *G06V 10/54* (2022.01)
  *G06V 10/74* (2022.01)
  *G06V 10/764* (2022.01)
  *H04N 19/167* (2014.01)
  *H04N 19/182* (2014.01)
  *H04N 19/46* (2014.01)

(52) U.S. Cl.
  CPC ......... *G06V 10/764* (2022.01); *H04N 19/167* (2014.11); *H04N 19/182* (2014.11); *H04N 19/46* (2014.11)

(56) References Cited

U.S. PATENT DOCUMENTS

| | | |
|---|---|---|
| 2019/0379856 A1 | 12/2019 | Hur et al. |
| 2020/0045290 A1 | 2/2020 | Ruhm et al. |
| 2021/0176496 A1* | 6/2021 | Chupeau .............. G06T 7/529 |
| 2022/0138990 A1* | 5/2022 | Fleureau .............. G06T 15/20 382/232 |

OTHER PUBLICATIONS

International Searching Authority, "International Search Report and Written Opinion," issued in connection with International Patent Application No. PCT/US2020/066944, mailed Apr. 19, 2021, 10 pages.

Salahieh et al., "Test Model 4 for Immersive Video," by ISO/IEC JTC 1/SC 29/WG 11 N19002, dated Feb. 29, 2020, Brussels, BE, Jan. 2020, 45 pages.

Boyce et al., "Working Draft 4 of Immersive Video," by ISO/IEC JTC 1/SC 29/WG 11 N19001, dated Feb. 28, 2020, Brussels, BE, Jan. 2020, 69 pages.

Salahieh Basel et al.: "Multi-Pass Renderer in MPEG Test Model for Immersive Video", 2019 Picture Coding Symposium (PCS), IEEE, Nov. 12, 2019 (Nov. 12, 2019), pp. 1-5, XP033688149, Doi: 10.1109/ PCS48520.2019.8954515 [retrieved on Jan. 8, 2020].

European Patent Office, "Extended European Search Report," issued in connection with European Patent Application No. 20931480.6—1208, dated Mar. 20, 2024, 10 pages.

* cited by examiner

TEXTURE BASED IMMERSIVE VIDEO CODING

RELATED APPLICATIONS

This patent arises from the U.S. national stage of International Application No. PCT/US2020/066944, which was filed Dec. 23, 2020, which claims the benefit of U.S. Provisional Patent Application No. 63/009,356, which was filed on Apr. 13, 2020. International Application No. PCT/US2020/066944 and U.S. Provisional Patent Application No. 63/009,356 are hereby incorporated herein by reference in their entireties. Priority to International Application No. PCT/US2020/066944 and U.S. Patent Application No. 63/009,356 is hereby claimed.

FIELD OF THE DISCLOSURE

This disclosure relates generally to video coding, and, more particularly, to texture based immersive video coding.

BACKGROUND

In compression/decompression (codec) systems, compression efficiency and video quality are important performance criteria. For example, visual quality is an important aspect of the user experience in many video applications, and compression efficiency impacts the amount of memory storage needed to store video files and/or the amount of bandwidth needed to transmit and/or stream video content. A video encoder compresses video information so that more information can be sent over a given bandwidth or stored in a given memory space or the like. The compressed signal or data is then decoded by a decoder that decodes or decompresses the signal or data for display to a user. In many implementations, higher visual quality with greater compression is desirable.

Currently, standards are being developed for immersive video coding, including Moving Picture Experts Group (MPEG) Immersive Video Coding. Such standards seek to establish and improve compression efficiency and reconstruction quality in the context of immersive video and point cloud coding.

BRIEF DESCRIPTION OF THE DRAWINGS

The figures are not to scale. In general, the same reference numbers will be used throughout the drawing(s) and accompanying written description to refer to the same or like parts.

Figure 1:
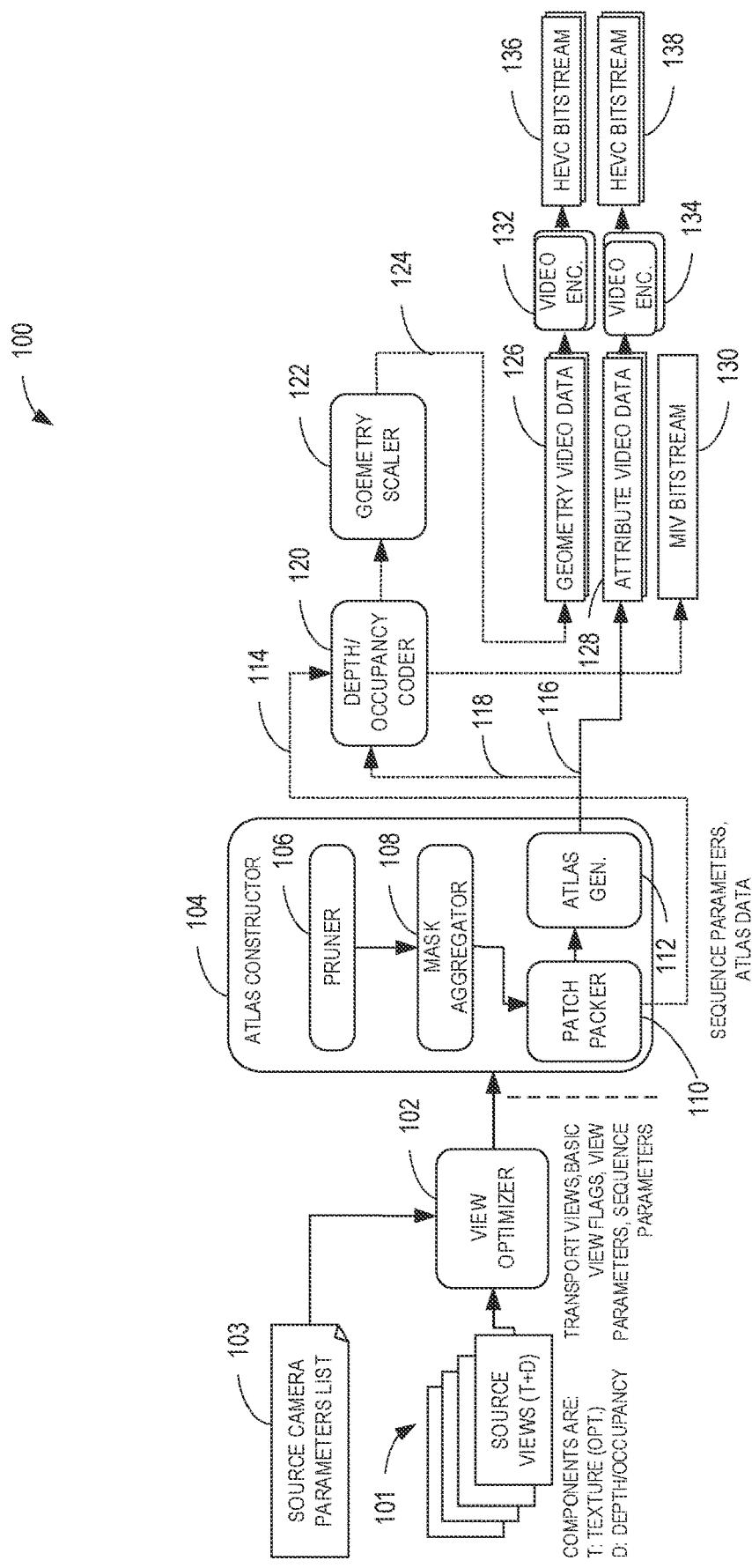
FIG. 1 is a block diagram of an example MPEG immersive video (MIV) encoder.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

Advancements in digital media technology are enabling delivering of compelling immersive experiences with new media formats. The Moving Picture Experts Group (MPEG) is one standardization group that is developing standards to support immersive media access and delivery. For example, the coded representation of immersive media (MPEG-I) is a set of immersive media industry standards directed to immersive media formats, such as panoramic 360° video, volumetric point-clouds, and immersive video.

MPEG is developing an immersive video coding standard called MPEG immersive video (MIV). Reference is made to the MIV standard (J. Boyce, R. Doré, V. Kumar Malamal Vadakital (Eds.), "Working Draft 4 of Immersive Video", ISO/IEC JTC1/SC29/WG11 MPEG/N19001, January 2020, Brussels, Belgium) and the test model for immersive video (TMIV) (B. Salahieh, B. Kroon, J. Jong, M. Domanski (Eds.), "Test Model 4 for Immersive Video", ISO/IEC JTC1/SC29/WG11 MPEG/N19002, January 2020, Brussels, Belgium), which are herein referred to as "immersive video coding standards". The MIV standard specifies the bitstream format and decoding process for immersive video. The test model for immersive video discusses a reference encoding process and rendering process; however, these processes are not normative to the MIV standard.

The MIV draft standard codes texture and depth video for multiple input views, each at a particular position and orientation, using a High Efficiency Video Coding (HEVC) video codec. The MIV standard does not specify the reference renderer but specifies the required metadata and decoded streams. The intended output of the reference renderer is a perspective viewport of the texture, with the viewport selected based upon a viewer's position and orientation, and generated using the outputs of the immersive media decoder. The MIV standard enables the viewer to dynamically move with 6 Degrees of Freedom (6DoF), adjust position (x, y, z) and orientation (yaw, pitch, roll) within a limited range (e.g., as supported by a head mounted display, a two-dimensional (2D) monitor with positional inputs as examples, etc.).

In the MIV standard, depth information (also known as geometry) may be mandated as part of the bitstream for immersive video coding, which may require additional bandwidth if streamed along with the texture content. Additionally, encoding operations implemented in the test model of MIV, such as pruning, clustering, and packing, rely on depth only, without considering textural information, hence important immersive cues (e.g. specularities, transparencies, varying lighting conditions for the captured views from the different cameras) are missing in the extracted patches (i.e. rectangular regions from views). Furthermore, it may be a costly operation to estimate depth maps if they are not directly captured/provided, and depth consistency may be difficult to maintain across all cameras for natural content due to the local nature of the depth estimation algorithms. Therefore, some services opt not to use depth and are not currently supported by MIV. Currently, texture content from various capturing camera may be encoded and transmitted separately using standard video codecs, such as High Efficiency Video Coding (HEVC) or predictively encoded using a Multi-View Extension of video codecs, such as MV-HEVC. Then, view synthesizing techniques may be invoked to render the desired viewport based on the decoded texture content and the viewport information (i.e., the targeted viewing position and orientation). Such view synthesis may require a depth estimation (or another type of disparity information) preprocessing step on the decoded texture to perform the projections properly. However, such approaches do not fully exploit angular redundancy across different views as simultaneous encoding of separate views results in redundancy in the encode. In MV-HEVC, inter-view prediction is similar to traditional inter-frame temporal prediction but with only horizontal shifts in the block motion model supported, which leads to inefficient bandwidth utilization in comparison to the reprojection-based approach to exploit inter-view correlation employed in MIV.

Methods, apparatus, and systems for texture based immersive video coding are disclosed herein. Example encoding techniques and metadata signaling techniques disclosed herein have depth optional and occupancy maps signaled separately, to support correspondence encoding operations, and to make it possible to exclude depth from the MIV bitstream. In some disclosed example encoding techniques, only texture information is utilized per input view, without the need for depth information per input view. Camera parameters are also utilized but may also be estimated/inferred from the texture content. Disclosed example encoding techniques include identifying correspondence patches in texture content across the available input views to remove redundant texture information. Disclosed example encoding techniques transmit the texture content with the identified correspondence patches in the encoded bitstream. Disclosed example techniques provide further savings in bandwidth (as depth is not encoded as part of the encoded bitstream), which allows for more immersive cues to be delivered, and support a broader range of immersive applications.

Example decoding techniques disclosed herein receive the input bitstream, which includes coded texture videos, coded occupancy videos, and metadata. Disclosed example decoding techniques infer depth information from the coded texture videos. Disclosed example decoding techniques obtain correspondence information in the coded texture videos. Disclosed example decoding techniques use texture patches and corresponding texture patches from other views to infer depth information in the video data. Disclosed example decoding techniques further include synthesizing a viewport based on the texture patches and corresponding texture patches along with the metadata and desired viewing position and orientation.

FIG. 1 is a block diagram of an example immersive video (MIV) encoder 100. The example MIV encoder 100 includes an example view optimizer 102, an example atlas constructor 104, an example depth/occupancy coder 120, an example geometry scaler 122, an example video encoder 132, and an example video encoder 134. The example MIV encoder 100 receives example source views 101. For example, the source views 101 include texture data (e.g., texture bitstreams) and depth data (e.g., depth bitstreams) of the captured scene. As used herein, "texture" and "attribute" are used interchangeably and refer to visible aspects of a pixel, such as the color component (e.g., red-green-blue (RGB) components) of the pixel. As used herein, "depth" and "geometry" are used interchangeably unless noted otherwise as the geometry of a pixel typically includes the pixel's depth, which refers to the distance of the pixel from a reference plane. For example, the source views 101 can be source views generated by video capturers, virtual views generated by a computer, etc. In the illustrated example, the source views 101 are represented as a video sequence. The example MIV encoder 100 further receives an example source camera parameter list 103. For example, the source camera parameter list 103 can include where source cameras are positioned, the angle of source cameras, etc.

The example view optimizer 102 selects views to encode. For example, the view optimizer 102 analyzes the source views 101 and selects which views to encode. In some examples, the view optimizer 102 labels views of the source views 101 as a basic view or an additional view. As used herein, a basic view is an input view that is to be packed in an atlas as a single patch. As used herein, an additional view is an input view that is to be pruned and packed in one or more patches. For example, the view optimizer 102 can determine how many basic views there can be in the input views based on criteria such as pixel rate constraints, a sample count per input view, etc.

The example atlas constructor 104 receives basic and/or additional views determined by the example view optimizer 102. The atlas constructor 104 forms patches from the selected views (e.g., basic and/or additional views), using pruning and clustering, and packed into one or more atlases, each of which contains an optional texture component and a required depth component, as illustrated in connection with FIG. 2. The example atlas constructor 104 includes an example pruner 106, an example mask aggregator 108, an example patch packer 110, and an example atlas generator 112. The example pruner 106 prunes the additional views. For example, the pruner 106 projects the depth and/or texture data of the basic views onto the respective depth and/or texture data of the additional views and/or the previously pruned views to extract non-redundant occluded regions.

The example mask aggregator 108 aggregates the pruning results generated by the example pruner 106 to generate patches. For example, the mask aggregator 108 accumulates the pruning results (e.g., pruning masks) over an intra-period (e.g., a predetermined collection of frames) to account for motion. The example patch packer 110 packs the patches into one or more example atlases 116. For example, the patch packer 110 performs clustering (e.g., combining pixels in a pruning mask to form patches) to extract and pack rectangular patches into atlases. In some examples, the patch packer 110 updates the content per frame across the processed intra-period.

The patch packer 110 tags the patch with a patch identifier (e.g., a patch ID). The patch ID identifies the patch index. For example, the patch IDs can range from 0 to one less than the number of patches generated. The patch packer 110 can generate a block to patch map (e.g., a patch ID map). The block to patch map is a 2D array (e.g., representative of point positions/locations in an atlas) indicating the patch ID associated with a given block of one or more pixels. The patch packer 110 provides example data 114 (includes the block to patch map and patch ID data) to the depth/occupancy coder 120. The atlas generator 112 generates the atlases with a depth/occupancy component 118 and atlases 116 with an optional texture component using the patch data from the patch packer 110. The atlas generator 112 provides the atlases with the depth/occupancy component 118 to the depth/occupancy coder 120. The atlas generator 112 provides the atlases 116 with the optional texture component as attribute (texture) video data 128 to the example video encoder 134.

The depth/occupancy coder 120 generates an occupancy map to indicate whether a pixel of the patch is occupied (e.g., valid) or unoccupied (e.g., invalid). In some examples, the occupancy map is a binary map. In some such examples, the occupancy map has a value of 1 to indicate a pixel is occupied and a value of 0 to indicate a pixel is not occupied. The depth/occupancy coder 120 generates the occupancy map based on the block to patch map and patch ID data included in the data 114 from the patch packer 110 and based on the data of the atlases with the depth/occupancy component 118 from the atlas generator 112. The depth/occupancy coder 120 includes the occupancy map, the block to patch map, and the patch ID data in the example MIV data bitstream 130. In the illustrated example, the MIV data bitstream 130 includes patch parameters to map them between views and atlases, the packing order to reveal overlapped patches needed to retrieve block to patch maps later, the Video-based Point Cloud Compression (V-PCC) parameter set, and adaptation parameter set (including the view parameters), and any other metadata from the video coded data.

The geometry scaler 122 obtains the depth (geometry) data of the atlases from the depth/occupancy coder 120. The geometry scaler 122 performs quantization and scaling of the geometry video data per atlas that includes the depth data. The geometry scaler 122 provides the atlases with the depth (geometry) component 124 as depth (geometry) video data 126 to the example video encoder 132.

The example video encoder 132 generates encoded atlases from the depth (geometry) video data 126. The example video encoder 134 generates encoded atlases from the attribute (texture) video data 128. For example, the video encoder 132 receives the example depth (geometry) video data 126 (including atlases) and encodes the depth component into an example HEVC bitstream 136 using an HEVC video encoder. Additionally, the video encoder 134 receives the example attribute (texture) video data 128 (including atlases) and encodes the texture component into an example HEVC bitstream 138 using an HEVC video encoder. However, the example video encoder 132 and the example video encoder 134 can additionally or alternatively use an Advanced Video Coding (AVC) video encoder, etc. The example HEVC bitstream 136 and the example HEVC bitstream 138 may include patch parameters to map them between views and atlases, the packing order to reveal overlapped patches needed to retrieve block to patch maps later, etc. related to the depth (geometry) video data 126 and the attribute (texture) video data 128, respectively.

Figure 2:
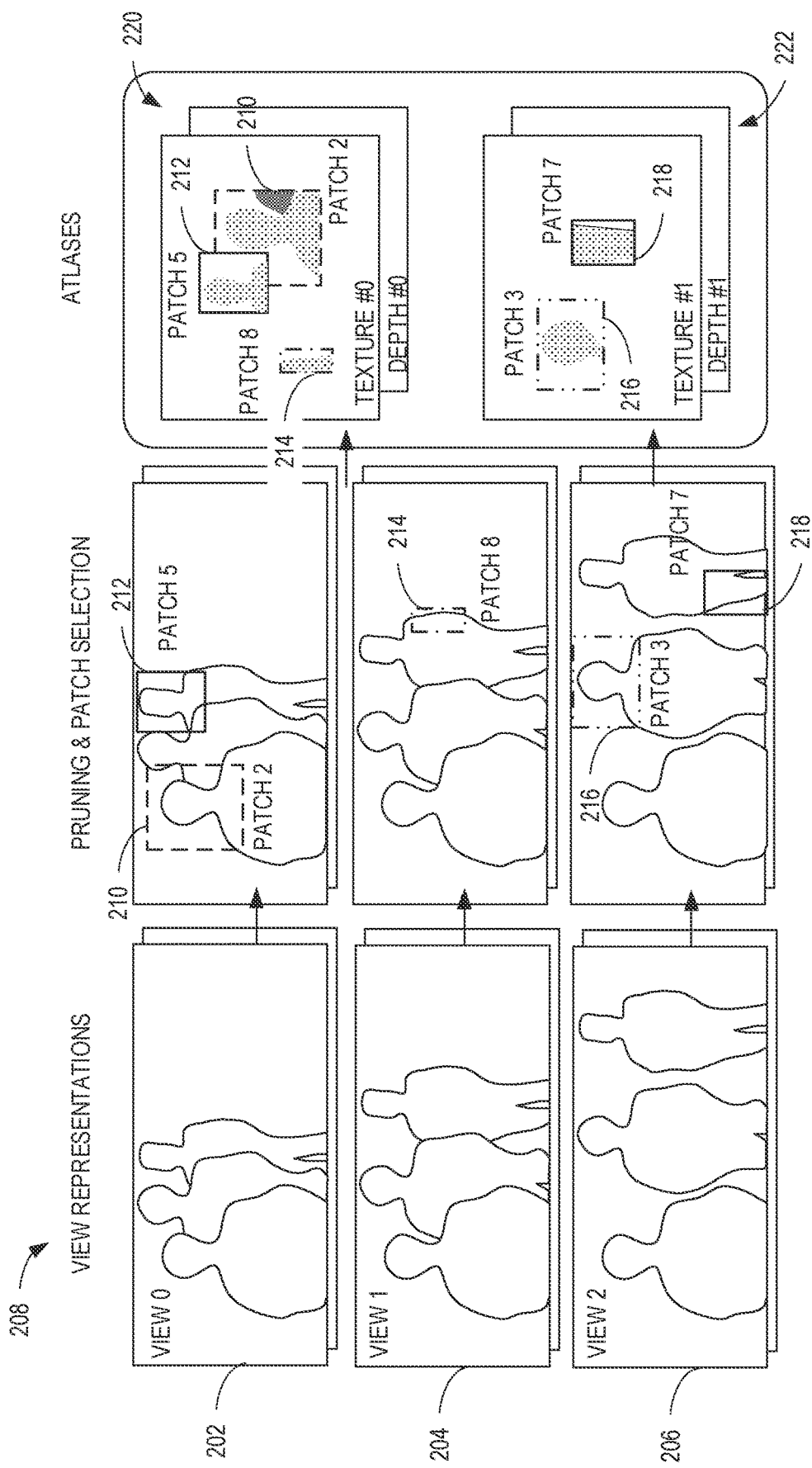
FIG. 2 illustrates example patch formation from selected input views.

FIG. 2 illustrates example patch formation from selected input views. The input views include an example first view 202, an example second view 204, and an example third view 206. For example, the first view 202 is the view 0, the second view 204 is the view 1, and the third view 206 is the view 2. For example, the views 202, 204, 206 include view representations 208 (e.g., attribute (texture) maps, geometry (depth) maps, entity (object) maps). In the illustrated example of FIG. 2, the view representations 208 of the views 202, 204, 206 include three people. That is, the views 202, 204, 206 are captured from three different cameras at three different angles with respect to the three people.

The example pruner 106 (FIG. 1) prunes the views 202, 204, 206 to generate patches. For example, the first view 202 includes an example first patch 210 and an example second patch 212, the second view 204 includes an example third patch 214, and the third view 206 includes an example fourth patch 216 and an example fifth patch 218. In some examples, each patch corresponds to one respective entity (object). For example, the first patch 210 corresponds to a first person's head, the second patch 212 corresponds to a second person's head, the third patch 214 corresponds to the second person's arm, the fourth patch 216 corresponds to a third person's head, and the fifth patch 218 corresponds to the second person's leg.

In some examples, the patch packer 110 (FIG. 1) tags the patches with patch IDs. For example the patch packer 110 tags the first patch 210 with a patch ID of 2, the second patch 212 with a patch ID of 5, the third patch 214 with a patch ID of 8, the fourth patch 216 with a patch ID of 3, and the fifth patch 218 with a patch ID of 7.

The example atlas generator 112 (FIG. 1) generates an example first atlas 220 and an example second atlas 222. The atlases 220, 222 include a texture (attribute) map and a depth (geometry) map. In the illustrated example, the first atlas 220 includes the example first patch 210, the example second patch 212, and the example third patch 214. In the illustrated example, the second atlas 222 includes the example fourth patch 216 and the example fifth patch 218.

Figure 3:
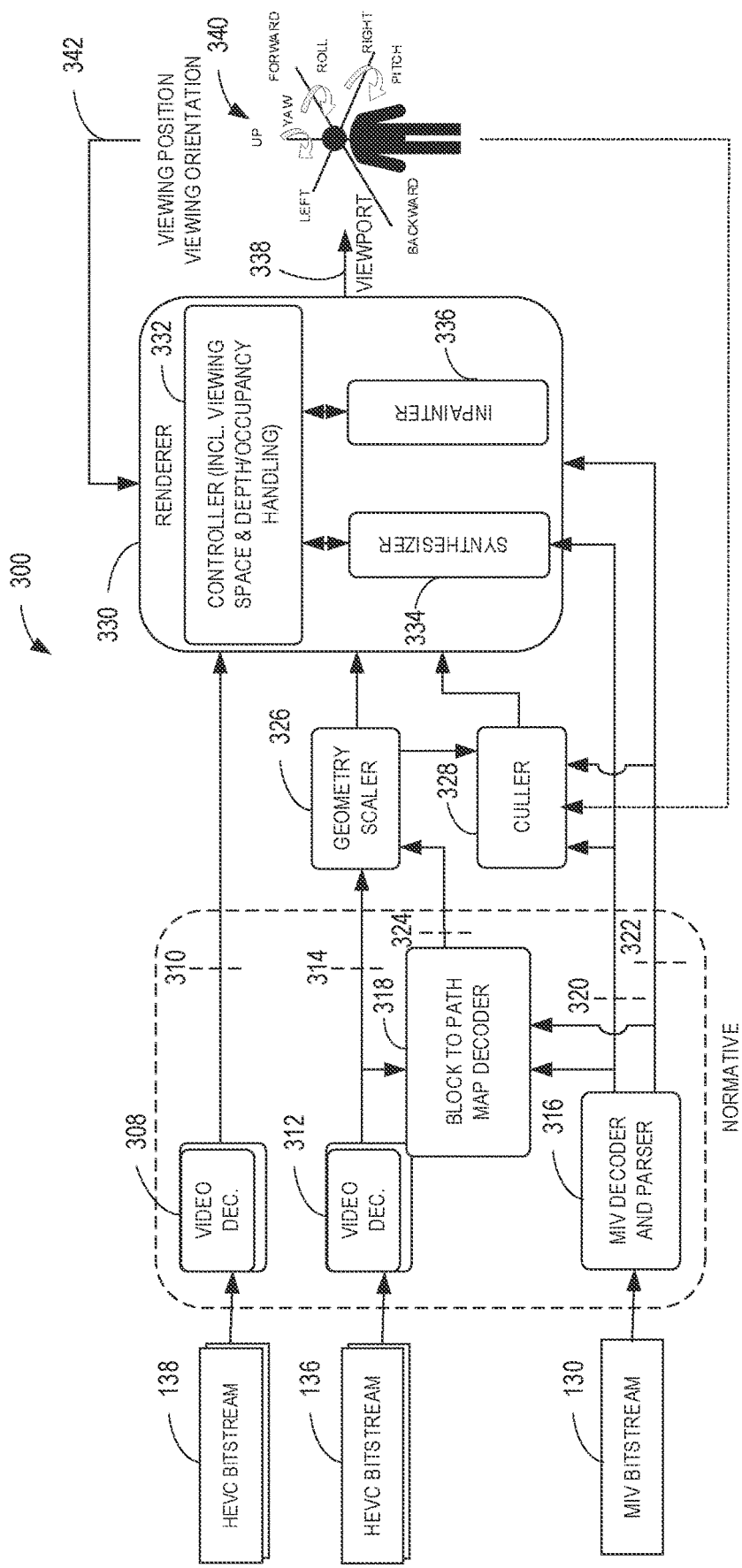
FIG. 3 is a block diagram of an example MIV decoder.

FIG. 3 is a block diagram of an example immersive video (MIV) decoder 300. The example MIV decoder 300 includes an example video decoder 308, an example video decoder 312, an example block to patch map decoder 318, an example MIV decoder and parser 316, an example geometry scaler 326, an example culler 328, and an example renderer 330. The example renderer 330 includes an example controller 332, an example synthesizer 334, and an example inpainter 336. In the illustrated example of FIG. 3, the MIV decoder 300 receives a coded video sequence (CVS) for each of the video-substreams for the geometry components and optionally the texture attributes. In some examples, the MIV decoder 300 receives the example MIV data bitstream 130, the example HEVC bitstream 136, and the example HEVC bitstream 138 from the example MIV encoder 100 (FIG. 1).

In the illustrated example of FIG. 3, the video decoder 308 receives the HEVC bitstream 138. The HEVC bitstream 138 includes patch parameters related to the attribute (texture) video data. Examples of such parameters include a map of patches between views and atlases, the packing order to reveal overlapped patches utilized to retrieve block to patch maps later, etc. The video decoder 308 generates a sequence of decoded texture pictures 310. The video decoder 312 receives the HEVC bitstream 136. The HEVC bitstream 136 includes patch parameters related to the depth (geometry) video data. Examples of such parameters include a map of patches between views and atlases, the packing order to reveal overlapped patches utilized to retrieve block to patch maps later, etc. The video decoder 308 generates a sequence of decoded depth pictures 314. The video decoder 308 and the video decoder 312 generate sequences of decoded picture pairs of the decoded texture pictures 310 and the decoded depth pictures 314. In some examples, the decoded texture pictures 310 and the decoded depth pictures 314 may have the same or different resolutions. In the illustrated example, the example decoded texture pictures 310 and the example decoded depth pictures 314 represent an example atlas. In some examples, the video decoder 308 and the video decoder 312 can be an HEVC decoders. In the illustrated example of FIG. 3, the video decoder 308 provides the decoded texture pictures 310 to the renderer 330. The video decoder 312 provides the decoded depth pictures 314 to the geometry scaler 326 and to the block to patch map decoder 318.

The MIV decoder and parser 316 receives the MIV data bitstream 130. The example MIV decoder and parser 316 parses the MIV data bitstream 130 to generate example atlas data 320 and an example Video-based Point Cloud Compression (V-PCC) and viewpoint parameter set 322. For example, the MIV decoder and parser 316 parses the encoded MIV data bitstream 130 for the example patch list, camera parameter list, etc. The MIV decoder and parser 316 provides the atlas data 320 and the V-PCC and viewpoint parameter set 322 to the example block patch map decoder 318, the example culler 328, and the example renderer 330.

The block to patch map decoder 318 receives the decoded depth pictures 314 from the video decoder 312 and the atlas data 320 (including the patch list and camera parameters list) and the V-PCC and viewpoint parameter set 322 from the example MIV decoder and parser 316. The block to patch map decoder 318 decodes the block to patch map 324 to determine point position/locations in the atlas(es) of the decoded depth pictures 314. In the illustrated example, the block to patch map 324 is a 2D array (e.g., representative of point positions/locations in an atlas) indicating the patch ID associated with a given block of one or more pixels of the decoded depth pictures 314. The block to patch map decoder 318 provides the block to patch map 324 to the example geometry scaler 326. In the illustrated example of FIG. 3, the geometry scaler 326 performs upscaling of the geometry video data per atlas included in the decoded depth pictures 314. The geometry scaler 326 provides the upscaled geometry video data per atlas included in the decoded depth pictures 314 to the example culler 328 and the example renderer 330.

The example culler 328 receives the geometry-scaled block to patch map 324 from the geometry scaler 326, and also receives the atlas data 320 (including the patch list and camera parameters list) and the V-PCC and viewpoint parameter set 322 from the example MIV decoder and parser 316. The culler 328 performs patch culling based on an example viewing position and viewing orientation 340 (e.g., a target view). The culler 328 can receive the viewing position and viewing orientation 340 from a user. The culler 328 uses the block to patch map 324 to filter out blocks from the atlas data 320 that are not visible based on the target viewing position and viewing orientation 340.

The example renderer 330 generates an example viewport 338. For example, the renderer 330 accesses one or more of the decoded atlases from the decoded texture pictures 310 and the decoded depth pictures 314, the atlas data 320 (e.g., the atlas parameters list, the camera parameters list, the atlas patch occupancy map), and the viewer position and orientation 342. That is, the example renderer 330 outputs a perspective viewport of the texture images, selected based on the example viewer position and orientation 342. In examples disclosed herein, the viewer is able to dynamically move (e.g., adjust the viewer position and orientation 342) with 6 Degrees of Freedom (6DoF), adjusting position (x, y, z) and orientation (yaw, pitch, roll) within a limited range (e.g., as supported by a head mounted display or 2-D monitor with positional inputs or the like). The renderer 330 generates the example viewport 338 based on both the required depth components (decoded depth pictures 314) and optional texture components (decoded texture pictures 310) whether they include patches, views, or atlases.

In the illustrated example of FIG. 3, the renderer 330 includes the controller 332, the synthesizer 334, and the inpainter 336. The example controller 332 accesses the atlas patch occupancy map from the atlas data 320, which indicates whether the pixel of the atlas in the decoded depth pictures 314 or the decoded texture pictures 310 is occupied in the viewer position and orientation 342. The controller 332 reconstructs pruned views from the patches in the atlases of the decoded texture pictures 310 and the decoded depth pictures 314 using the block to patch maps, which is described in further detail below in connection with FIG. 4. In examples disclosed herein, a pruned view is a partial view representation of a source (input) view at the encoder side (e.g., the MIV encoder 100 of FIG. 1), occupied by patches carried within the atlases of the decoded texture pictures 310 and the decoded depth pictures 314. The controller 332 reconstructs the pruned views that belong to the viewer position and orientation 342. In some examples, the pruned views that belong to the viewer position and orientation 342 may include holes due to the existence of their content in another pruned or complete view. The synthesizer 334 performs view synthesis based on the atlas patch occupancy map and the reconstructed pruned views from the controller 332 and the viewer position and orientation 342. In examples disclosed herein, the inpainter 336 fills any missing pixels in the reconstructed pruned views with matching values.

Figure 4:
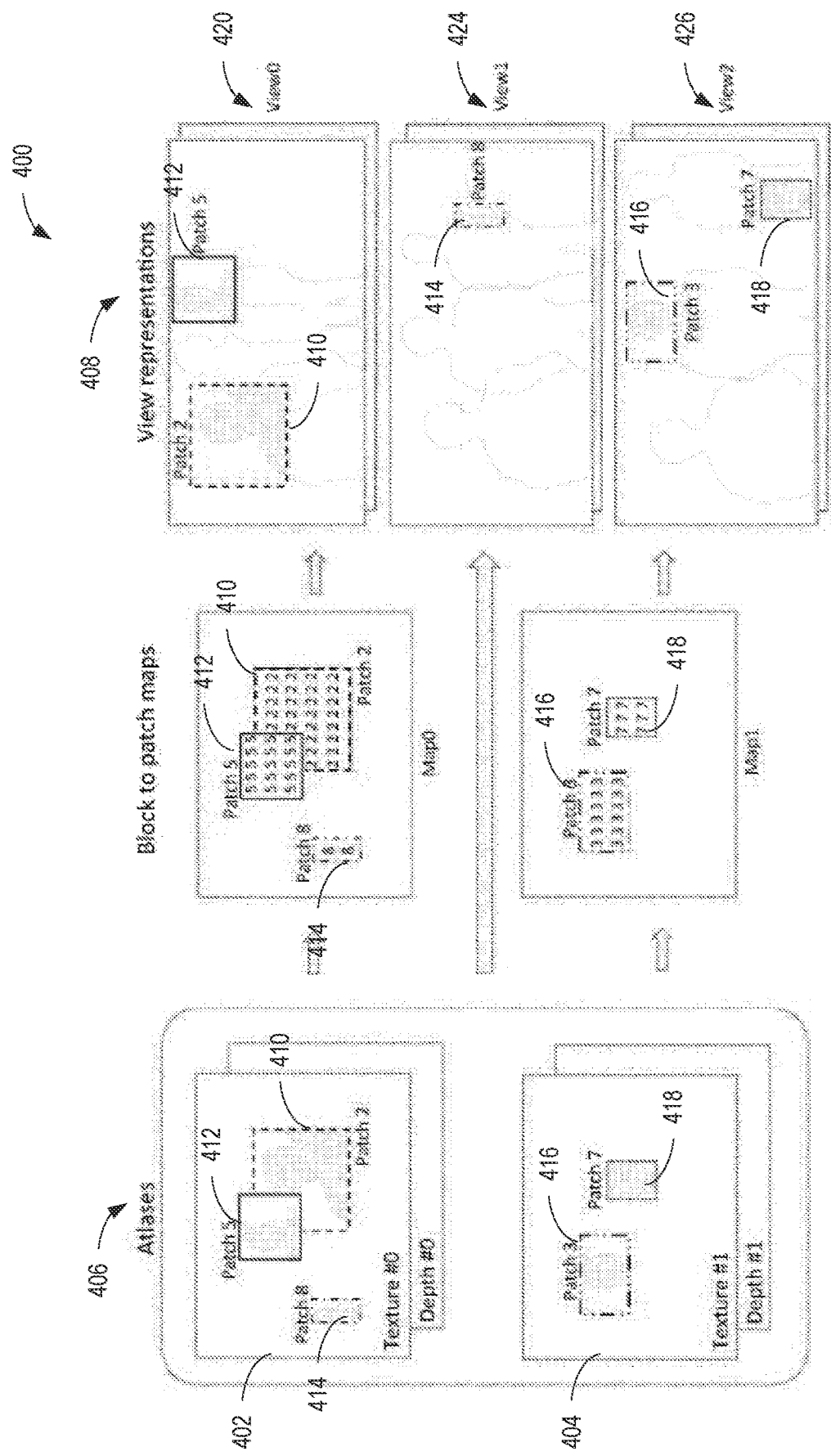
FIG. 4 illustrates example reconstruction of pruned views from atlas patches.

FIG. 4 illustrates example reconstruction 400 of pruned views from atlas patches. As shown in FIG. 4, the atlases 406 include atlas 402 and atlas 404. In some examples, the video decoder 308 (FIG. 3) and the video decoder 312 (FIG. 3) decode the atlases 402, 404. In the illustrated example of FIG. 4, the atlases 402, 404 include a texture map and a depth map. The atlas 402 includes an example first patch 410, an example second patch 412, and an example third patch 414. The atlas 404 includes an example fourth patch 416 and an example fifth patch 418. In some examples, the patches include the patch IDs determined by the example patch packer 110 (FIG. 1). For example, the first patch 410 includes a patch ID of 2, the second patch 412 includes a patch ID of 5, the third patch 414 includes a patch ID of 8, the fourth patch 416 includes a patch ID of 3, and the fifth patch 418 includes a patch ID of 7.

In some examples, the block to patch map decoder 318 (FIG. 3) matches the first patch 410, the second patch 412, the third patch 414, the fourth patch 416, and the fifth patch 418 to the available views 420, 424, 426 included in the view representations 408 using block to patch maps. The block to patch map decoder 318 matches the patches to the available view to at least partially reconstruct the available views 420, 424, 426. For example, the block to patch map decoder 318 matches the first patch 410 and the second patch 412 to the first available view 420, the third patch 414 to the second available view 424, and the fourth patch 416 and the fifth patch 418 to the third available view 426.

In some examples, each patch corresponds to one respective entity (object) in the available views (e.g., the first available view 420, the second available view 424, and the third available view 426). For example, the first patch 410 corresponds to a first person's head and the second patch 412 corresponds to a second person's head in the first available view 420, the third patch 414 corresponds to the second person's arm in the second available view 424, and the fourth patch 416 corresponds to a third person's head and the fifth patch 418 corresponds to the second person's leg in the third available view 426.

Figure 5:
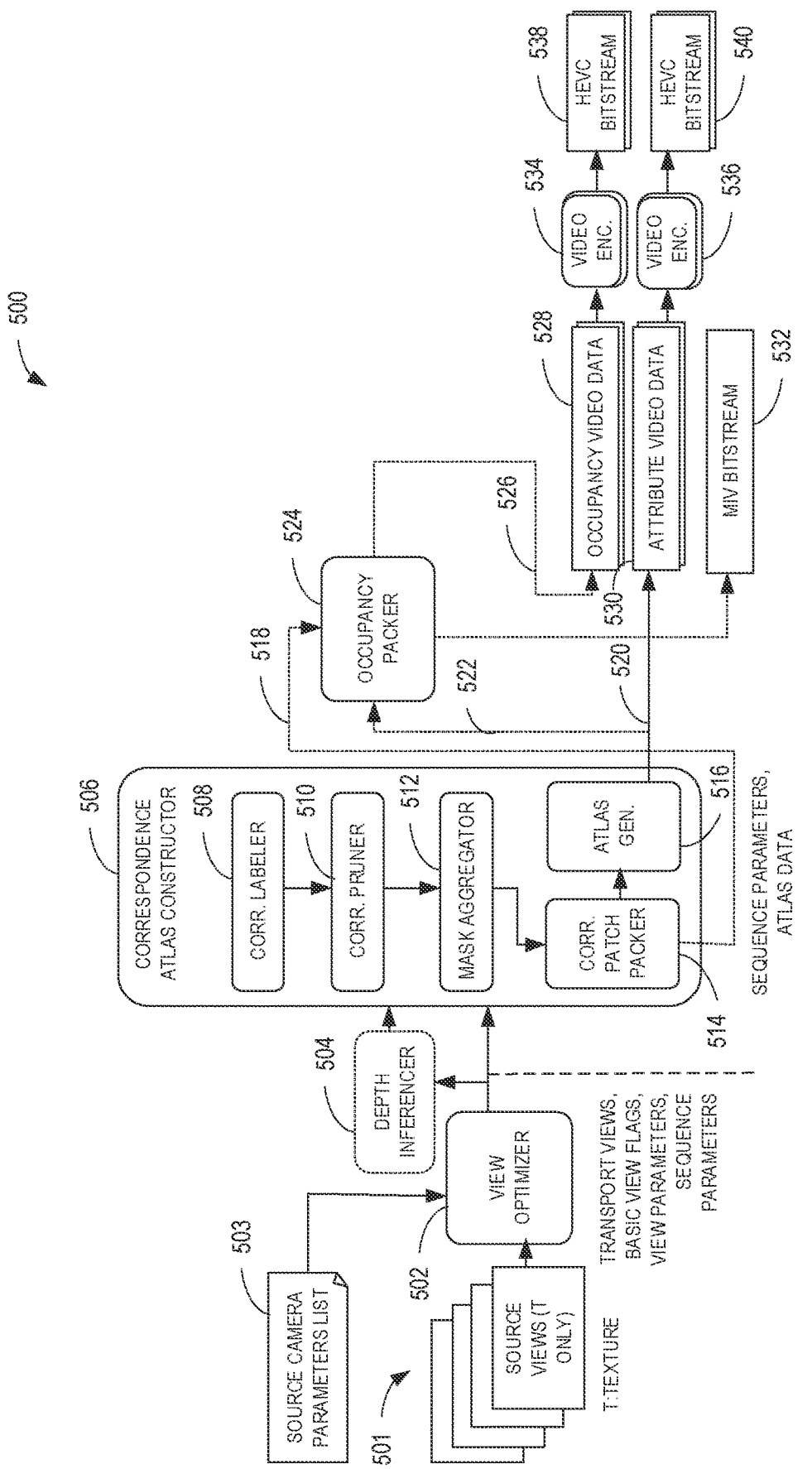
FIG. 5 is a block diagram of an example texture-based MIV encoder in accordance with teachings of this disclosure.

FIG. 5 is a block diagram of an example texture-based immersive video (MIV) encoder 500 in accordance with teachings of this disclosure. In the texture based MIV encoder 500 of the illustrated example, only attributes (e.g., texture, entities, reflectance, etc.) are input per view, with depth per view not being provided (or being optional). Camera parameters may be employed (e.g., encoded) in some embodiments. In some examples, such camera parameters may be estimated/inferred from the texture content (e.g., at a decoder). In the illustrated example of FIG. 5, the example texture-based MIV encoder 500 includes an example view optimizer 502, an example depth inferencer 504, an example correspondence atlas constructor 506, an example occupancy packer 524, an example video encoder 534, and an example video encoder 536. The example correspondence atlas constructor 506 includes an example correspondence labeler 508, an example correspondence pruner 510, an example mask aggregator 512, an example correspondence patch packer 514, and an example atlas generator 516.

In the illustrated example, the example texture-based MIV encoder 500 receives example source views 501. For example, the source views 501 include texture data (e.g., texture bitstreams), and possibly depth data (e.g., depth bitstreams), of the captured scene. For example, the source views 501 can be source views generated by video capturers, virtual views generated by a computer, etc. Additionally or alternatively, the source views 501 include other attributes (e.g., entities, reflectance, etc.). In the illustrated example, the source views 501 are represented as a video sequence. The example texture-based MIV encoder 500 further receives an example source camera parameter list 503. For example, the source camera parameter list 503 can include where source cameras are positioned, the angle of source cameras, etc.

The example view optimizer 502 uses the camera parameters from the camera parameter list 503 to identify views to encode. For example, the view optimizer 502 analyzes the source views 501 and selects which views to encode. In some examples, the view optimizer 502 labels views of the source views 501 as a basic view or an additional view. As used herein, a basic view is an input view that is to be packed in an atlas as a single patch. As used herein, an additional view is an input view that is to be pruned and packed in one or more patches. In examples disclosed herein, the view optimizer labels the source views 501 with view identifications (IDs).

The example depth inferencer 504 performs an optional depth inference process to retrieve depth information from the source views 501. For examples, the depth inferencer 504 may estimate actual depth maps for the source views 501, compute disparity representation of the source views 501 using techniques such as optical flow, use structure from motion techniques across views to find a point cloud representation per view, etc. In examples disclosed herein, the depth inferencer 504 determines if there is any depth information included in the source views 501. If the depth inferencer 504 does not determine any depth information, or the depth inferencer 504 is omitted from an example implementation, then the texture-based MIV encoder 500 proceeds with only the texture information included in the source views 501.

The correspondence atlas constructor 506 receives basic and/or additional views determined by the example view optimizer 102. The correspondence atlas constructor 506 evaluates the texture content/information in the basic and/or additional views to identify the unique texture information per source view and extract the unique texture information as patches. Additionally or alternatively, the correspondence atlas constructor 506 evaluates other attribute content/information (e.g., entities, reflectance, etc.) in the basic and/or additional views to identify unique attribute information per source view and extract the unique attribute information as patches. In some examples, the correspondence atlas constructor 506 evaluates the optional depth information (if available) from the depth inferencer 504. The correspondence atlas constructor 506 forms patches from the selected views (e.g., basic and/or additional views), using labeling, pruning, and clustering to determine the patches. The correspondence atlas constructor 506 includes the correspondence labeler 508, the correspondence pruner 510, the mask aggregator 512, the correspondence patch packer 514, and the atlas generator 516.

The correspondence labeler 508 identifies the corresponding pixels across all views (e.g., basic and/or additional views) and labels them based on the texture content (and/or other attribute content) and depth information if available. Accordingly, the correspondence labeler 508 is an example of means for identifying unique pixels and corresponding pixels. In examples disclosed herein, a first pixel and a second pixel (the first pixel from a first view and the second pixel from a second view) are regarded as corresponding pixels if the unprojection of the first pixel from the first view to the 3D world and subsequent reprojection of the first pixel to the second view would place the first pixel in the same location as the second pixel from the second view. In examples disclosed herein, the first view and the second view can be basic views, additional views, and/or a combination of a basic view and an additional view. In some examples, the correspondence labeler 508 can use multi-view feature extraction and pattern recognition techniques (e.g., traditional or AI-based) to identify and label matched pixels across all views after being trained on similar multi-view content.

In the illustrated example, the correspondence labeler 508 labels pixels as either unique or corresponding to thereby identify corresponding pixels across all source views from the view optimizer 502. The correspondence labeler 508 labels pixels as "unique" for those pixels from any view that have no corresponding pixels in the other available views. For example, pixels located in edge regions of terminal cameras or in occluded regions visible only by a specific view are typically labeled as "unique" pixels. The correspondence labeler 508 labels pixels as "corresponding" for those pixels from any view that have one or more corresponding pixels in the other available views. For each group of two or more corresponding pixels, the correspondence labeler 508 determines if the corresponding pixels in that group have similar texture content. For example, the correspondence labeler 508 compares the texture content between two corresponding pixels and compares the difference in the texture content to a threshold. In some examples, the threshold may be a difference in the color components (e.g., red-green-blue (RGB) components). For example, the threshold may be a difference of 5 (or some other value) between any one of the color components. The correspondence labeler 508 determines that corresponding pixels have similar texture content when the difference in the texture content is below the threshold. The correspondence labeler 508 labels corresponding pixels as "similar texture" and stores the view IDs of the source views that include the corresponding pixels along with the coordinate (e.g., x, y) positions of the corresponding pixels in a correspondence list. For example, a correspondence list may contain the entries: {(4, 27, 33), (7, 450, 270)}. In this example, there are two corresponding, similar texture pixels (one is located in the source view with the view ID 4 at the image coordinates (27,33) and the other located in the source view with the view ID 7 at the image coordinates (450, 270).

In some examples, the correspondence labeler 508 determines that corresponding pixels have different texture content (although they have corresponding projected locations and, thus, are classified as corresponding pixels) when the difference in the texture content is above the threshold. In some examples, the corresponding pixels can be determined to have different texture content based on different specular information, different illumination/lighting information, color inconsistencies due to different camera settings, etc. The correspondence labeler 508 labels the corresponding pixels as "different texture" and stores the view IDs of the source views that include the corresponding pixels along with the coordinate (e.g., x, y) positions of the corresponding pixels into a correspondence list. In examples disclosed herein, the correspondence labeler 508 includes the additional labels "similar texture" and "different texture" for corresponding pixels to allow the correspondence pruner 510 to use such information to reduce redundancies and thereby output non-redundant information. In some examples, the correspondence labeler can use other names/identifiers for the "similar texture" and "different texture" labels, and/or additional labels for the pixels to indicate differences of corresponding pixels in attributes other than texture, if available. For examples, additional labels could identify differences in transparencies, reflectance, motion, etc. The correspondence labeler 508 outputs correspondence labeling maps and indexed (e.g., corresponding_id) pixel-wise correspondence lists for views involved in correspondence cases.

The correspondence pruner 510 determines a pruning order according to one or more criteria (e.g., overlapped information between views, the distance between capturing cameras, etc.), which may be pre-determined, configurable, etc. In examples disclosed herein, the basic views are ordered first during pruning. In some examples, a first one of the basic views (e.g., selected based on one or more criteria) is kept unpruned and any other basic views and additional views included in the source views 501 may be pruned. In examples disclosed herein, the correspondence pruner 510 prunes the source views and outputs binary pruning masks (one per view) indicating if a pixel in a view is to be kept (e.g., pruning mask pixel set to "1") or removed (e.g. pruning mask pixel set to "0"). The correspondence pruner 510 prunes the source views using the labeled pixels from the correspondence labeler 508.

In some examples, the correspondence pruner 510 initializes the pixels of the pruning masks to 0 (or some other initial value). In some examples, the correspondence pruner sets all pixels in the pruning mask corresponding to the first (or only) basic view to 1 (or some other value different from the initial value) to indicated that none of the pixels of the first basic view are pruned away. The correspondence pruner 510 identifies the pixels labeled as "unique" and as "corresponding, different texture" by the correspondence labeler 508 for each of the other views and sets the pixels in the corresponding pruning masks for the views with the value 1. In some examples, the correspondence pruner 510 can choose to set a weighting scheme for the "corresponding, different texture" pixels such that those that belong to largely overlapping views are pruned away and views that are far from each other are kept. For example, views may be considered far from each other when the distance between the sources of the views (e.g., cameras) meet a threshold (e.g., 10 feet apart, 20 feet apart, etc.).

The correspondence pruner 510 searches the correspondence lists for the other views and identifies the pixels labeled as "corresponding, similar texture" by the correspondence labeler 508 for each of the other views. In some examples, if at least two of the pixels included in the correspondence list belong to two previously pruned views, then the correspondence pruner 510 keeps the pixels in the associated pruning mask at 0 (e.g., the initial value, to indicate the pixels are to be pruned). Otherwise, the correspondence pruner 510 sets the pixels in the associated pruning mask to 1 (e.g., the value other than the initial value, to indicate the pixels are not to be pruned). In some examples, at least two pixels labeled as "corresponding, similar texture" in two pruning views are selected and set to 1 in the associated pruning masks to be used by an example decoder to infer depth information.

In examples disclosed herein, the correspondence pruner 510 repeats the pruning until all pixels across all views are processed to identify the pruning masks per view. Additionally or alternatively, the correspondence pruner 510 can complete the pruning using other attribute content/information (e.g., entities, reflectance, etc.). Accordingly, the correspondence pruner 510 is an example of means for generating a pruning mask. The correspondence pruner 510 maintains corresponding pixels in the encoded bitstream if they have different texture information or minimal correspondent information to deliver important information that can be used by an example decoder to determine the depth information that is absent in the texture-based MIV encoder 500.

The example mask aggregator 512 aggregates the pruning results generated by the example correspondence pruner 510 to generate patches. For example, the mask aggregator 108 accumulates the pruning results (e.g., pruning masks) over an intra-period (e.g., a predetermined collection of frames) to account for motion. Accordingly, the mask aggregator 512 is an example of means for aggregating pruning masks. The example correspondence patch packer 514 performs clustering on the aggregated pruning masks from the mask aggregator 512.

In some examples, the correspondence patch packer 514 extracts patches that can be tagged with the respective patch-wise correspondence lists which include patch identification (patch_ids) that identify corresponding patches. The correspondence patch packer 514 identifies adjacent pixels at a given aggregated pruned mask that have no correspondence (e.g., the adjacent pixels are both labeled as "unique") and groups the adjacent pixels into one patch. In examples disclosed herein, the patch the adjacent pixels are grouped into is associated with an empty patch-wise correspondence list.

In some examples, the correspondence patch packer 514 identifies the adjacent pixels at a given aggregated pruned mask that are labeled as "corresponding, similar texture" or "corresponding, different texture" with pixels in other aggregated pruned masks, and the correspondence patch packer 514 packs these adjacent pixels into one patch. The correspondence patch packer 514 also groups the associated pixels in all other aggregated pruned masks into one patch together per view, which results in multiple correspondence patches. The correspondence patch packer 514 tags the patch in the given aggregated pruned mask and the patches in all other aggregated pruned masks with patch-wise correspondence lists that indicate the patch_ids of the correspondence patches. In examples disclosed herein, the correspondence patches must belong to different views (e.g., each has a unique view_id). For example, two patches that belong to the same view (e.g., have the same view_id) cannot be corresponding patches. The correspondence patch packer 514 repeats this clustering until all pixels in the aggregated pruned masks are clustered and extracted in patches with associated correspondence information. Accordingly, the correspondence patch packer 514 is an example of means for determining patches. In examples disclosed herein, the correspondence patch packer 514 clusters all information of the first basic view into multiple patches (e.g., not a whole single patch) to establish correspondence with patches in the other available views.

In examples disclosed herein, to save in bits used when signaling the patch-wise correspondence lists for each patch in each view, it is possible to indicate only one corresponding patch per each patch in a cyclic manner. For example, assuming three corresponding patches of patch_id 2, 5, 8 respectively, a pdu_corresponding_id may be introduced in the patch parameters of each. In such examples, the patch of patch_id=2 has pdu_corresponding_id=5 or the full list pdu_corresponding_list=[5,8], the patch of patch_id=5 has pdu_corresponding_id=8 or the full list pdu_corresponding_list=[2,8], and the patch of patch_id=8 has pdu_corresponding_id=2 or the full list pdu_corresponding_list=[2,5].

Once clustering and extracting of patches is complete, the correspondence patch packer 514 can generate a block to patch map (e.g., a patch ID map). The block to patch map is a 2D array (e.g., representative of point positions/locations in an atlas) indicating the patch ID associated with the given block of one or more pixels.

The atlas generator 516 writes the texture patches into texture-only atlases 520 (since no depth component exists for atlases in the texture-based MIV encoder 500). The atlas generator 516 output the texture-only atlases 520 as the example attribute (texture) video data 530 to the example video encoder 536. Accordingly, the atlas generator 516 is an example of means for generating an atlas. The atlas generator 516 also outputs binary occupancy maps 522 (one per atlas) of the same size as the associated atlases to the example occupancy packer 524. The atlas generator 516 generates metadata conveying how patches are mapped between atlases in addition to the view parameters and other sequence information and outputs the metadata 518 to the example occupancy packer 524 and the example video encoder 536.

The occupancy packer 524 receives the occupancy maps 522 from the atlas generator 516. In some example, the occupancy packer 524 packs every X number of binary pixels (bits) as one component (e.g. X may be 8 bits, 10 bits, etc.), which results in reduced size for the explicitly signaled occupancy map to save in pixel rate. In some examples, the occupancy packer 524 uses run length coding techniques to compress repeating patterns in a lossless manner. In some examples, the occupancy packer 524 includes the packed occupancy maps 526, the block to patch map, and the patch ID data in the example MIV data bitstream 532. In the illustrated example, the MIV data bitstream 532 includes patch parameters to map them between views and atlases, the packing order to reveal overlapped patches needed to retrieve block to patch maps later, the Video-based Point Cloud Compression (V-PCC) parameter set, and adaptation parameter set (including the view parameters), and any other metadata from the video coded data. In some examples, the MIV data bitstream 532 includes a flag (or bit) to identify that the encoded video data does not include geometry (depth) information in the views/atlases.

The example video encoder 534 generates encoded atlases from the occupancy video data 528. The example video encoder 536 generates encoded atlases from the attribute (texture) video data 530. For example, the video encoder 534 receives the example occupancy video data 528 and encodes the packed occupancy map 526 into an example HEVC bitstream 538 using an HEVC video encoder. Additionally, the video encoder 536 receives the example attribute (texture) video data 530 (including atlases) and encodes the texture component into an example HEVC bitstream 540 using an HEVC video encoder. However, the example video encoder 534 and the example video encoder 536 can additionally or alternatively use an Advanced Video Coding (AVC) video encoder, etc. The example HEVC bitstream 538 and the example HEVC bitstream 540 may include patch parameters to map them between views and atlases, the packing order to reveal overlapped patches needed to retrieve block to patch maps later, etc. related to the occupancy video data 528 and the attribute (texture) video data 530, respectively. In examples disclosed herein, the packed occupancy maps in the occupancy video data 528 and the attribute (texture) video data 530 are video coded and multiplexed together along with the metadata included in the MIV data bitstream 532, which may be transmitted to a decoder (e.g., the example texture-based MIV decoder 700 of FIG. 7) and/or to a memory device for storage and eventual transmission to any number of decoders for decode and presentment to a user.

Figure 6:
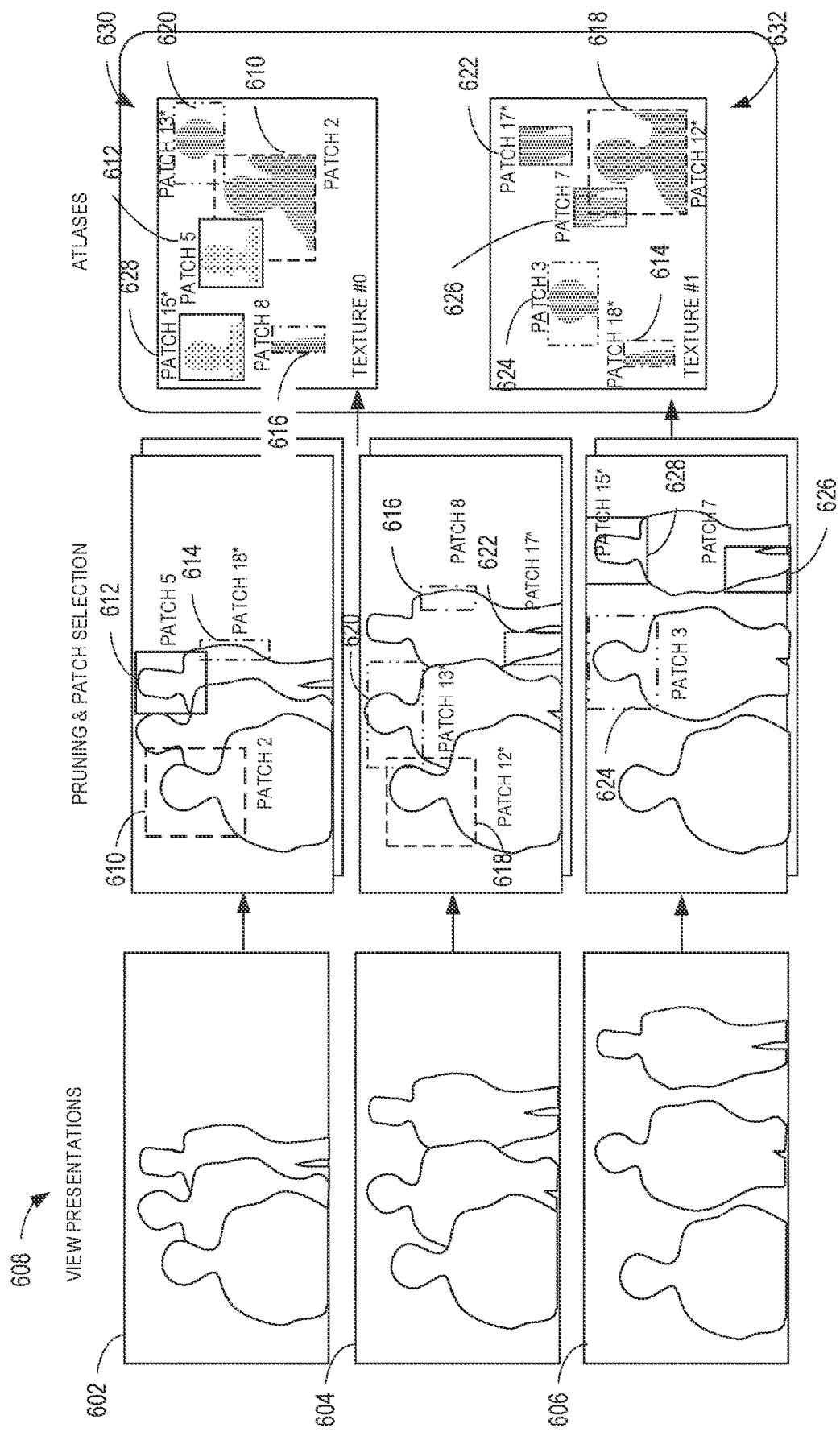
FIG. 6 illustrates example atlas generation from input views in the texture-based MIV encoder of FIG. 5.

FIG. 6 illustrates example atlas generation from input views in the texture-based MIV encoder 500 of FIG. 5. The input views include an example first view 602, an example second view 604, and an example third view 606. In the illustrated example, the first view 602 is also labeled as view 0, the second view 604 is also labeled as view 1, and the third view 606 is also labeled as view 2. In the illustrated example, the views 602, 604, 606 include view representations 608 (e.g., attribute (texture) maps). In the illustrated example of FIG. 6, the view representations 608 of the views 602, 604, 606 include three people. That is, the views 602, 604, 606 are captured from three different cameras at three different angles with respect to the three people.

The example correspondence pruner 510 (FIG. 5) prunes the views 602, 604, 606 to generate patches. For example, the first view 602 includes an example first patch 610 and an example second patch 612, the second view 604 includes an example third patch 616, and the third view 606 includes an example fourth patch 624 and an example fifth patch 626. In some examples, each patch corresponds to one respective entity (object). For example, the first patch 210 corresponds to a first person's head, the second patch 212 corresponds to a second person's head, the third patch 214 corresponds to the second person's arm, the fourth patch 216 corresponds to a third person's head, and the fifth patch 218 corresponds to the second person's leg.

The example correspondence pruner 510 prunes the views 602, 604, 606 to generate correspondence patches. For example, the first view 602 includes an example first correspondence patch 614, the second view 604 includes an example second correspondence patch 618, an example third correspondence patch 620, and an example fourth correspondence patch 622, and the third view 606 includes an example fifth correspondence patch 628. In examples disclosed herein, the correspondence pruner 510 uses the labeled pixels (e.g., corresponding, similar texture, different texture, etc.) from the example correspondence labeler 508 (FIG. 5) to identify the correspondence patches 614, 618, 620, 622, 628. In the illustrated example, the first correspondence patch 614 of the first view 602 corresponds to the third patch 616 of the second view 604, the second correspondence patch 618 of the second view 604 corresponds to the first patch 610 of the first view 602, the third correspondence patch 620 of the second view 604 corresponds to the fourth patch 624 of the third view 606, the fourth correspondence patch 622 of the second view 604 corresponds to the fifth patch 626 of the third view 606, and the fifth correspondence patch 628 of the third view 606 corresponds to the second patch 612 of the first view 602. In some embodiments, the threshold for determining the corresponding pixels may be adjusted so more pixels are regarded "different" rather than "similar" (as discussed above in connection with FIG. 5), which increase redundancy to transmit sufficient information so an example decoder can retrieve depth information from the patches. For examples, the correspondence pruner 510 includes more corresponding pixels in the correspondence patches.

In some examples, the correspondence patch packer 514 (FIG. 5) tags the patches with patch IDs and the correspondence patches with corresponding patch IDs. For example the correspondence patch packer 514 tags the first patch 610 with a patch ID of 2, the second patch 612 with a patch ID of 5, the third patch 616 with a patch ID of 8, the fourth patch 624 with a patch ID of 3, and the fifth patch 626 with a patch ID of 7. The correspondence patch packer 514 tags the first correspondence patch 614 with a patch ID of 18, the second correspondence patch 618 with a patch ID of 12, the third correspondence patch 620 with a patch ID of 13, the fourth correspondence patch 622 with a patch ID of 17, and the fifth correspondence patch 628 with a patch ID of 15.

The example atlas generator 516 (FIG. 5) generates an example first atlas 630 and an example second atlas 632. The atlases 630, 632 include a texture (attribute) map (e.g., Texture #0 and Texture #1). The example first atlas 630 includes the first patch 610, the second patch 612, the third patch 616, the third correspondence patch 620, and the fifth correspondence patch 628. The example second atlas 632 includes the fourth patch 624, the fifth patch 626, the first correspondence patch 614, the second correspondence patch 618, and the fourth correspondence patch 622. In some examples, the correspondence patch packer 514 generates correspondence lists associated with the first atlas 630 and the second atlas 632. The correspondence lists store the view IDs of the source views that include the corresponding pixels along with the coordinate (e.g., x, y) positions of the corresponding pixels. For example, the correspondence patch packer 514 identifies the pixels included in the first correspondence patch 614 and stores the view ID of the source view that includes the corresponding pixels (e.g., the first view 602) along with the coordinate (e.g., x, y) positions of the corresponding pixels in the first correspondence patch 614. The atlas generator 516 tags the first atlas 630 and the second atlas 632 with respective correspondence lists to identify the corresponding patches (e.g., the first correspondence patch 614, the second correspondence patch 618, the third correspondence patch 620, the fourth correspondence patch 622, and the fifth correspondence patch 628).

Figure 7:
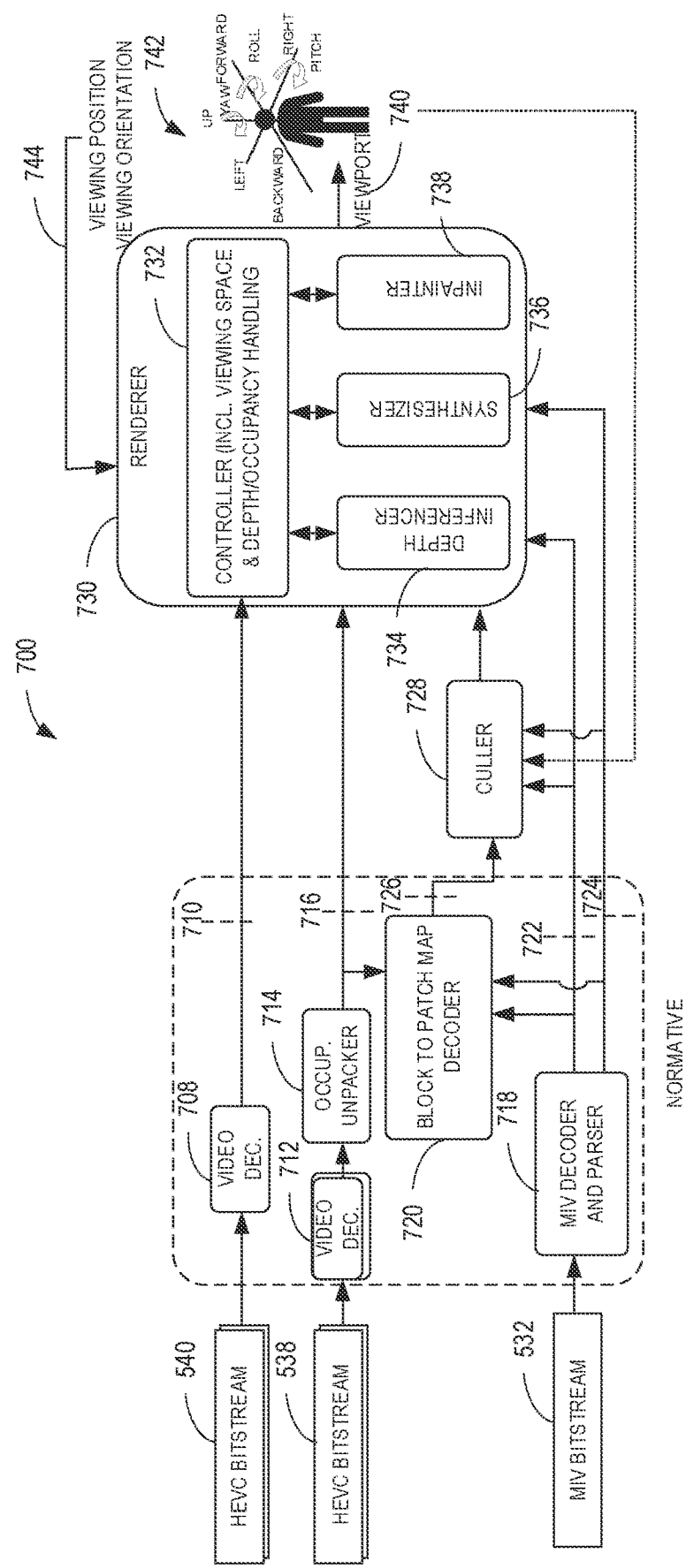
FIG. 7 is a block diagram of an example texture-based MIV decoder in accordance with teachings of this disclosure.

FIG. 7 is a block diagram of an example texture-based immersive video (MIV) decoder 700 in accordance with teachings of this disclosure. The example texture-based MIV decoder 700 includes an example video decoder 708, an example video decoder 712, an example occupancy unpacker 714, an example MIV decoder and parser 718, an example block to patch map decoder 720, an example culler 728, and an example renderer 730. The example renderer 730 includes an example controller 732, an example depth inferencer 734, an example synthesizer 736, and an example inpainter 738. As illustrated in FIG. 7, the input bitstream for texture-based MIV decoder 700 (e.g., as received from texture-based MIV encoder 500 of FIG. 5) includes coded texture videos, coded occupancy videos, and metadata. In some examples, the texture-based MIV decoder 700 receives the example HEVC bitstream 540, the example HEVC bitstream 538, and the example MIV data bitstream 532 from the example texture-based MIV encoder 500 (FIG. 5).

In the illustrated example of FIG. 7, the video decoder 708 receives the HEVC bitstream 540. The HEVC bitstream 540 includes patch parameters related to the attribute (texture) video data. Examples of such parameters include a map of patches between views and atlases, the packing order to reveal overlapped patches utilized to retrieve block to patch maps later, etc. The video decoder 708 generates a sequence of decoded texture pictures 710. The video decoder 712 receives the HEVC bitstream 538. The HEVC bitstream 538 includes patch parameters related to the decoded occupancy video data. Examples of such parameters include a map of patches between views and atlases, the packing order to reveal overlapped patches utilized to retrieve block to patch maps later, the occupancy map, etc. The video decoder 712 provides the decoded occupancy video data to the example occupancy unpacker 714. In the illustrated example, the example decoded texture pictures 710 represent an example atlas. In some examples, the video decoder 708 and the video decoder 712 can be HEVC decoders. Accordingly, the video decoder 708 and the video decoder 712 are examples of means for decoding encoded video data (e.g., the HEVC bitstream 538 and the HEVC bitstream 540). In the illustrated example of FIG. 7, the video decoder 708 provides the decoded texture pictures 710 to the renderer 730.

The example occupancy unpacker 714 reverses the packing process to retrieve the occupancy maps 716 of the same size as the texture atlases of the decoded texture pictures 710. In some examples, if the occupancy content is encoded using a run length encoding technique, the video decoder 712 and the occupancy unpacker 714 for occupancy is replaced by a run length decoder to reverse the encoding process and reconstruct the binary occupancy maps. In examples disclosed herein, the occupancy unpacker 714 provides the occupancy maps 716 to the renderer 730 and the block to patch map decoder 720.

The MIV decoder and parser 718 receives the MIV data bitstream 532. The example MIV decoder and parser 718 parses the MIV data bitstream 532 to generate example atlas data 722 and an example Video-based Point Cloud Compression (V-PCC) and viewpoint parameter set 724. For example, the MIV decoder and parser 718 parses the encoded MIV data bitstream 532 for the example patch list, camera parameter list, etc. In the illustrated example, the MIV decoder and parser 718 parses the MIV data bitstream 532 to identify if a flag (or bit) is set to indicate that the encoded video data does not include geometry (depth) information. Accordingly, the MIV decoder and parser 718 is an example of means for identifying a flag in the encoded video data (e.g., the MIV data bitstream 532) The MIV decoder and parser 718 provides the atlas data 722 and the V-PCC and viewpoint parameter set 724 to the example block patch map decoder 720, the example culler 728, and the example renderer 730.

The block to patch map decoder 720 receives the occupancy maps 716 from the video decoder 712 and the atlas data 722 (including the patch list and camera parameters list) and the V-PCC and viewpoint parameter set 724 from the example MIV decoder and parser 718. The block to patch map decoder 720 decodes the block to patch map 726 to determine point position/locations in the texture atlases and occupancy maps 716. In the illustrated example, the block to patch map 726 is a 2D array (e.g., representative of point positions/locations in an atlas) indicating the patch ID associated with a given block of one or more pixels of the texture atlases. The block to patch map decoder 720 provides the block to patch map 726 to the example culler 728. It is noted that in the texture-based techniques discussed herein, there is no depth (geometry) coded in the bitstream and, therefore, the geometry scaler is removed.

The example culler 728 receives the block to patch map 726 from the block to patch map decoder 729 and the atlas data 722 (including the patch list and camera parameters list) and the V-PCC and viewpoint parameter set 724 from the example MIV decoder and parser 718. The culler 728 performs patch culling based on an example viewing position and viewing orientation 742 (e.g., a target view). The culler 728 can receive the viewing position and viewing orientation 742 from a user. The culler 728 filters out blocks from the atlas data 722 based on the block to patch map 726 that are not visible based on the target viewing position and viewing orientation 742.

The example renderer 730 generates an example viewport 740. For example, the renderer 730 accesses one or more of the decoded atlases from the decoded texture pictures 310 and the occupancy maps 716, the atlas data 722 (e.g., the atlas parameters list, the camera parameters list, the atlas patch occupancy map), the V-PCC and viewpoint parameter set 724, and the viewer position and orientation 744. That is, the example renderer 730 outputs a perspective viewport of the texture images, selected based on the example viewer position and orientation 744. In examples disclosed herein, the viewer is able to dynamically move (e.g., adjust the viewer position and orientation 744) with 6 Degrees of Freedom (6DoF), adjusting position (x, y, z) and orientation (yaw, pitch, roll) within a limited range (e.g., as supported by a head mounted display or 2-D monitor with positional inputs or the like). Accordingly, the renderer 730 is an example of means for generating a target view. The renderer 730 generates the example viewport 740 based on both the texture components (decoded texture pictures 310) and inferred depth components based on correspondence texture components.

In the illustrated example of FIG. 7, the renderer 730 includes the controller 732, the depth inferencer 734, the synthesizer 736, and the inpainter 738. The example controller 732 accesses the atlas patch occupancy maps 716, which indicates whether the pixel of the atlas in the decoded texture pictures 710 is occupied in the viewer position and orientation 744. In examples disclosed herein, the decoded atlases of the decoded texture pictures 710 include sufficient information to enable depth inference as needed. In some examples, the controller 732 uses the block to patch maps to replace the patches within the atlases in the decoded texture pictures 710. The controller 732 reconstructs pruned views from the patches in the atlases of the decoded texture pictures 710 using the block to patch maps. In examples disclosed herein, a pruned view is a partial view representation of a source (input) view at the encoder side (e.g., the texture-based MIV encoder 500 of FIG. 5), occupied by patches carried within the atlases of the decoded texture pictures 710. The controller 732 reconstructs the pruned views that belong to the viewer position and orientation 744. In some examples, the pruned views that belong to the viewer position and orientation 744 may include holes due to the existence of their content in another pruned or complete view.

In the illustrated example, the depth inferencer 734 infers the depth information from the pruned views. Since each remapped patch in each view has at least one correspondence patch from a different pruned view (unless its pixels are labeled as "unique" during the encoding stage), the depth inferencer 734 uses the correspondence patches to determine (e.g., infer/estimate) the depth information from the atlases of the decoded texture pictures 710. In some examples, the depth inferencer 734 identifies correspondence patches using the pdu_correspondence_id (or pdu_correspondence_list) available within decoded texture pictures 710 (or supplemented in a related SEI message). The identification of the correspondent patches in the pdu_correspondence_id (or pdu_correspondence_list) allows for the depth inferencer 734 to efficiently search for correspondent pixels, for example, within a limited window (since the exact locations of the correspondent patches are known) thereby eliminating the need for costly search and block matching operations usually deployed in conventional stereo-based depth estimation techniques. In some examples, the depth inferencer 734 may use of more than two corresponding patches if available within the pruned views (e.g., for corresponding patches that are labeled as "corresponding, different texture" or those labeled as "corresponding, similar texture" with tolerance allowing more than two corresponding patches) to improve the estimation quality. The depth inferencer 734 delivers real-time performance interactively with the viewer motion.

In the illustrated example of FIG. 7, the synthesizer 736 performs view synthesis based on the atlas patch occupancy map and the reconstructed pruned views from the controller 732 and the viewer position and orientation 744. In examples disclosed herein, the inpainter 738 fills any missing pixels in the reconstructed pruned views with matching values.

Figure 8:
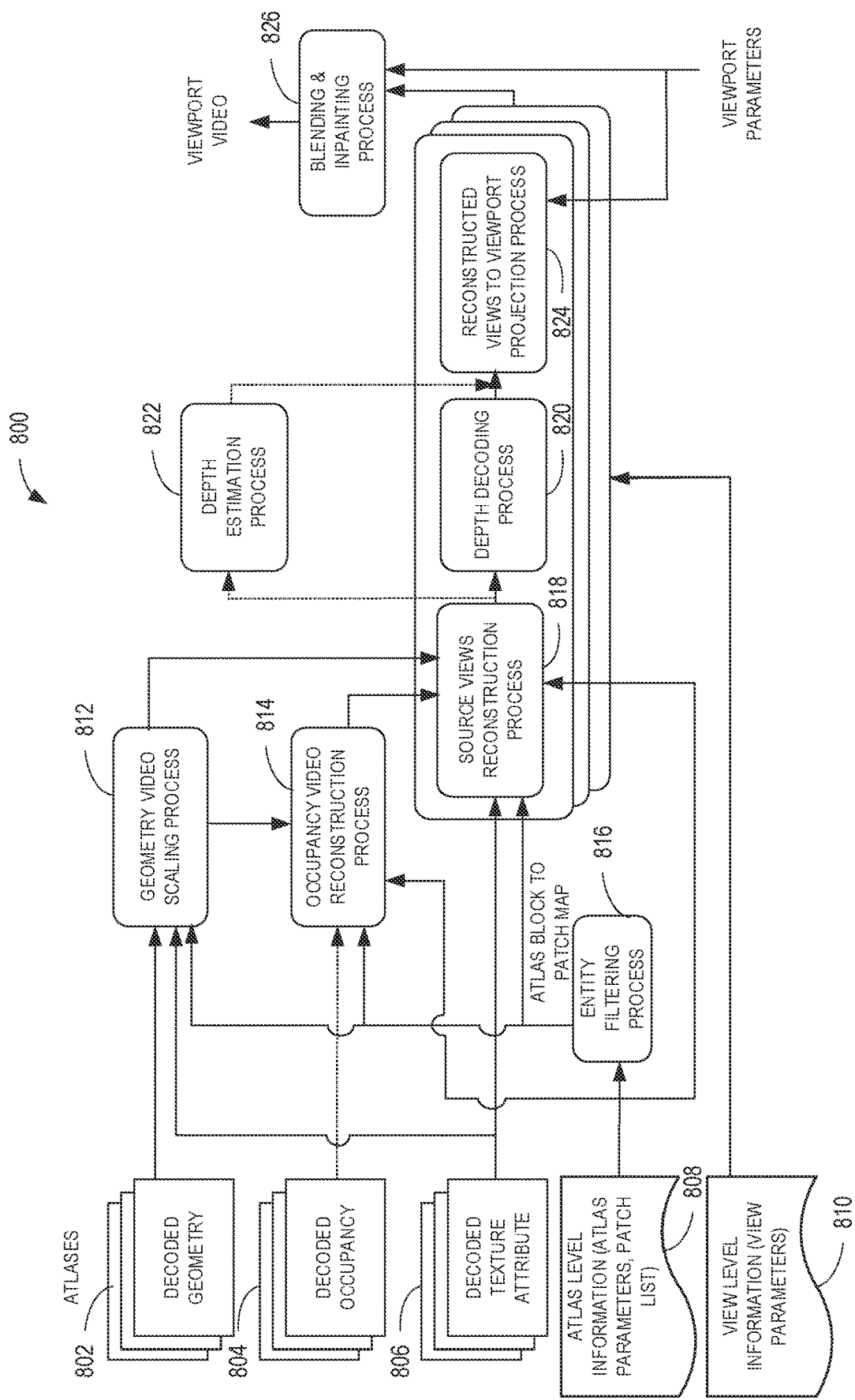
FIG. 8 is a block diagram of the example rendering process implemented by the texture-based MIV decoder of FIG. 7

FIG. 8 is a block diagram of the example rendering process implemented by in the texture-based MJV decoder 700 of FIG. 7. The example rendering process 800 includes example decoded geometry (depth) atlases 802, example decoded occupancy atlases 804, example decoded texture attribute atlases 806, example atlas information 808, example view information 810, an example geometry video scaling process 812, an example occupancy video reconstruction process 814, an example entity filtering process 816, an example source views reconstruction process 818, an example depth decoding process 820, an example depth estimation process 822, an example reconstructed views to viewport projecting process 824, and an example blending and inpainting process 826. In the illustrated example, the atlas information 808 includes atlas parameters and a patch list, and the view information 810 includes the view parameters. The example rendering process 800 illustrates the rendering process of the texture-based MIV decoder 700 (FIG. 7) when depth information is available or not available.

In the illustrated example, the entity filtering process 816 parses the atlas information 808 to identify bitstream indicators (e.g., flags, bits, etc.) that identify if depth (geometry) atlases are included in the bitstream. For example, the atlas information 808 may include a flag (e.g., vps_geometry_video_present_flag [j] where j indicates a binary value of 0 or 1) for an atlas to identify if depth information is included in the atlas. In some examples, if the atlas information 808 indicates depth information is present, the example geometry video scaling process 812 proceeds to decode the geometry (depth) information from the decoded geometry (depth) atlases 802. In the illustrated example, the occupancy video reconstruction process 814 reconstructs the occupancy maps for the decoded occupancy atlases 804 and the decoded texture attribute atlases 806.

In some examples where the atlas information 808 indicates depth information is present, the example rendering process performs the example source views reconstruction process 818, the example depth decoding process 820, and the example reconstructed views to viewport projecting process 824 to determine and output a perspective viewport of the texture and geometry images using the decoded geometry (depth) atlases 802, the decoded occupancy atlases 804, the decoded texture attribute atlases 806, the atlas information 808, and the view information 810. In examples where the atlas information 808 indicates depth information is not present, the example rendering process 800 does not perform the example depth decoding process 820 and, instead, performs the depth estimation process 822. In such examples, the depth estimation process 822 uses the decoded occupancy atlases 804, the decoded texture attribute atlases 806, the atlas information 808, and the view information 810 to determine (e.g., infer/estimate) depth values from each of the texture attribute atlases 806. In the illustrated example of FIG. 8, the rendering process 800 can determine depth information from provided depth atlases (e.g., the decoded geometry (depth) atlases 802) or from inferring depth from the provided occupancy maps and texture atlases (e.g., the decoded occupancy atlases 804 and the decoded texture attribute atlases 806). In examples disclosed herein, an indicator included in the atlas information 808 determines which process (e.g., the example depth decoding process 820 or the example depth estimation process 822) is performed to determine the depth information for the perspective viewport.

Figure 9:
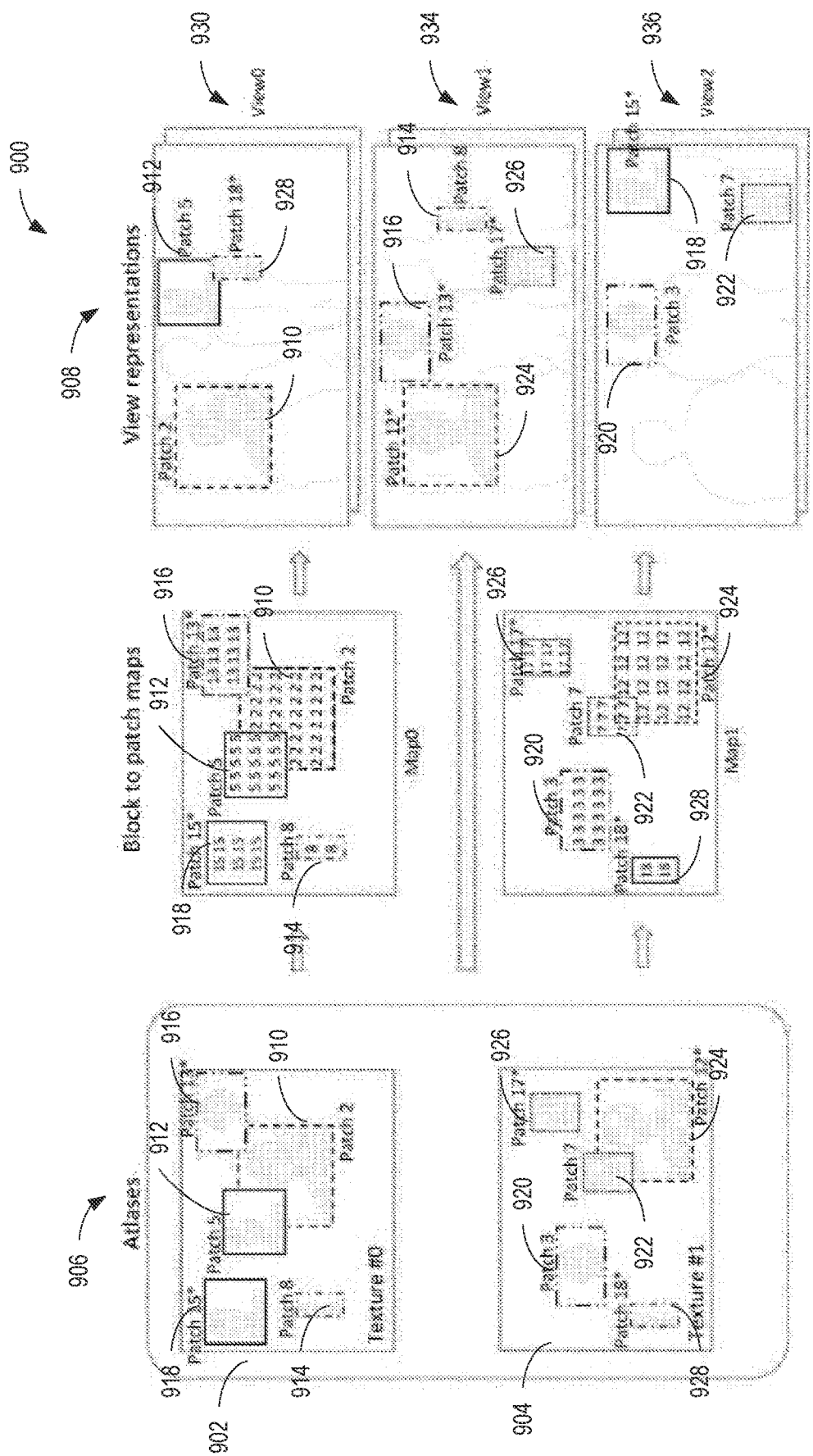
FIG. 9 illustrates example atlas view reconstruction in the texture-based MIV decoder of FIG. 7.

FIG. 9 illustrates example atlas view reconstruction 900 in the texture-based MIV decoder 700 of FIG. 7. As shown in FIG. 9, the atlases 906 include atlas 902 and atlas 904. In some examples, the video decoder 708 (FIG. 7) and the video decoder 712 (FIG. 7) decode the atlases 902, 904. In the illustrated example of FIG. 9, the atlases 902, 904 include a texture map (e.g., Texture #0 and Texture #1). The atlas 902 includes an example first patch 910, an example second patch 912, an example third patch 914, an example first correspondence patch 916, and an example second correspondence patch 918. The example atlas 904 includes an example fourth patch 920, an example fifth patch 922, an example third correspondence patch 924, an example fourth correspondence patch 926, and an example fifth correspondence patch 928. In some examples, the patches include the patch IDs and the correspondence patch include the corresponding patch IDs determined by the example correspondence patch packer 514 (FIG. 5). For example, the first patch 910 includes a patch ID of 2, the second patch 912 includes a patch ID of 5, the third patch 914 includes a patch ID of 8, the fourth patch 920 includes a patch ID of 3, and the fifth patch 922 includes a patch ID of 7. The first correspondence patch 916 with a patch ID of 13, the second correspondence patch 918 with a patch ID of 15, the third correspondence patch 924 with a patch ID of 12, the fourth correspondence patch 622 with a patch ID of 17, and the fifth correspondence patch 928 with a patch ID of 18.

In some examples, the block to patch map decoder 720 (FIG. 7) matches the first patch 910, the second patch 912, the third patch 914, the first correspondence patch 916, the second correspondence patch 918, the fourth patch 920, the fifth patch 922, the third correspondence patch 924, the fourth correspondence patch 926, and the fifth correspondence patch 928 to the available views 930, 934, 936 included in the example view representations 908 using block to patch maps. The block to patch map decoder 720 matches the patches and correspondence patches to the available view to at least partially reconstruct the available views 930, 934, 936. For example, the block to patch map decoder 720 matches the first patch 910, the second patch 912, and the fifth correspondence patch 928 to the first available view 930, the third patch 914, the first correspondence patch 916, the third correspondence patch 924, and the fourth correspondence patch 926 to the second available view 934, and the fourth patch 920, the fifth patch 922, and the second correspondence patch 918 to the third available view 936.

In some examples, each patch and correspondence patch correspond to one respective entity (object) in the available views (e.g., the first available view 930, the second available view 934, and the third available view 936). For example, the first patch 910 in the first available view 930 and the third correspondence patch 924 in the second available view 934 correspond to a first person's head, the second patch 912 in the first available view 930 and the second correspondence patch 918 correspond to a third person's head, the third patch 914 in the second available view 934 and the fifth correspondence patch 928 in the first available view 930 correspond to the third person's arm, the fourth patch 920 in the third available view 936 and the first correspondence patch 916 in the second available view 934 correspond to a second person's head, and the fifth patch 922 and the fourth correspondence patch 926 correspond to the third person's leg. In examples disclosed herein, the patches (e.g., the first patch 910, the second patch 912, the third patch 914, the fourth patch 920, and the fifth patch 922) are matched to the correspondence patches (e.g., the first correspondence patch 916, the second correspondence patch 918, the third correspondence patch 924, the fourth correspondence patch 926, and the fifth correspondence patch 928) in separate available views to provide additional texture information from the texture maps to determine depth information not provided in the atlases (e.g., the atlas 902 and the atlas 904). In some examples, the example video decoder 708 (FIG. 7) decodes the example HEVC bitstream 540 (FIG. 7) to identify the atlases 902, 904 and the respective correspondence lists from the example texture-based MIV encoder 500 of FIG. 5. The correspondence lists for the atlases 902, 904 identify the view ID of the source view and the coordinate (e.g., x, y) positions of the corresponding pixels for each of the correspondence patches associated with the patches. For example, the correspondence list for the atlas 902 identifies the source view of the first correspondence patch 916 (the first available view 930) and the coordinate (e.g., x, y) positions of the corresponding pixels included in the first correspondence patch 916 as being associated with (e.g., matched to) the fourth patch 920.

Figure 10:
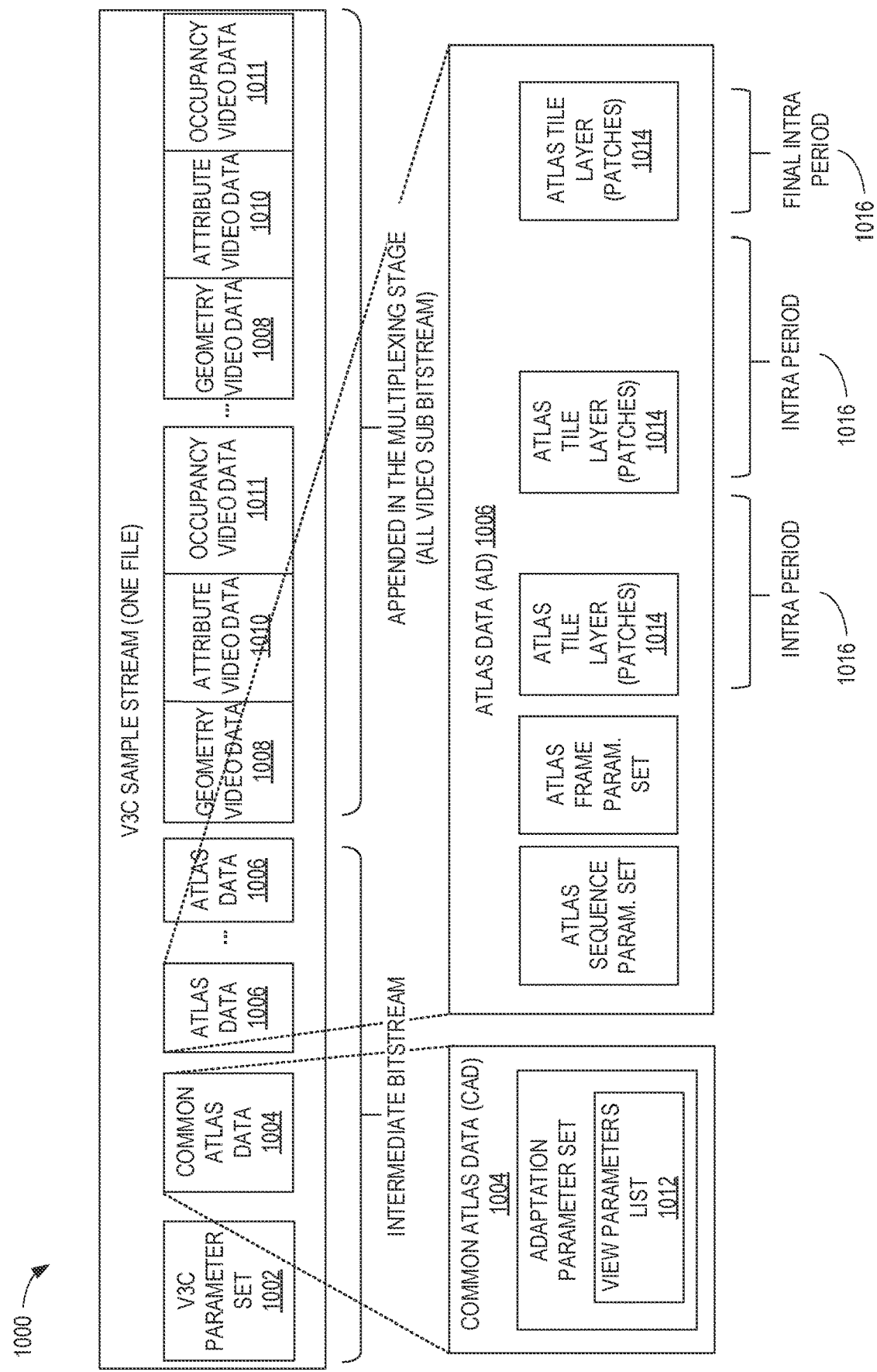
FIG. 10 illustrates an example Video-Based Volumetric Video Coding (V3C) sample stream with MIV extensions.

FIG. 10 illustrates an example V3C sample stream with MIV extensions (e.g., an example V3C sample stream 1000). For example, the texture-based MIV encoder 500 generates the V3C sample stream 1000. The example V3C sample stream 1000 includes an example V3C parameter set 1002, example common atlas data 1004, example atlas data 1006, example geometry video data 1008, example attribute video data 1010, and example occupancy video data 1011.

For example, the V3C parameter set 1002 includes example IV access unit parameters and example IV sequence parameters. The example common atlas data 1004 includes an example view parameters list 1012. For example, the common atlas data 1004 contains an atlas sub bitstream, but the main Network Abstraction Layer (NAL) unit is the common atlas frame (CAF) that contains the view parameters list 1012 or updates thereof. The example atlas data 1006 is a NAL sample stream, which includes example SEI messages. For example, the atlas data 1006 includes an atlas tile layer (ATL) that carries a list of patch data units (PDU). In examples disclosed herein, each PDU describes the relation between a patch in an atlas and the same patch in a hypothetical input view. The example atlas data 1006 includes example atlas tile layers 1014 (e.g., patch data 1014). For example, the patch data 1014 is sent only for example intra-periods 1016 (e.g., once per intra-period 1016). In some examples, a frame order count NAL unit is used to skip all interframes at once.

In examples disclosed herein, the adaptable parameter set (included in the common atlas data 1004) includes texture-based signaling options. In some examples, MIV operation modes are indicated by a dedicated metadata syntax element (e.g., aps_operation_mode) in the adaptation parameter set as follows in Table 1.

TABLE 1

| | Descriptor |
|---|---|
| adaptation_paramameter_set_rbsp( ) { | |
| ... | |
|    aps_operation_mode | u(4) |
| ... | |
| } | |

In some embodiments, aps_operation_mode specifies the MIV operation modes as defined in Table 2 as follows.

TABLE 2

| aps_operation_mode | Identifier | Description |
|---|---|---|
| 0 | MIV_TEXTURE | Coding atlases with texture only |
| 1 | MIV_DEPTH | Coding atlases with depth only |
| 2 | MIV_DEPTH_TEXTURE | Coding atlases with texture and depth |
| 3 | MIV_VIEW_TEXTURE | Coding complete views with texture only |
| 4 | MIV_VIEW_DEPTH | Coding complete views with depth only |
| 5 | MIV_VIEW_TEXTURE_DEPTH | Coding complete views with texture and depth |
| 6 | MIV_ENTITY | Coding atlases with patches indicating entities |

In examples disclosed herein, The V3C parameter set 1002 includes an example indicator (vps_geometry_video_present_flag[j]), where the index of the indicator (j) is set equal to 0 to indicate that geometry is not present.

In some examples, a vine_embedded_occupancy_flag is added to the vps_miv_extension( ) to indicate that occupancy is not embedded in the geometry, as defined below in connection with Table 3.

TABLE 3

| | Descriptor |
|---|---|
| vps_miv_extension( ) { | |
|   vme_depth_low_quality_flag | u(1) |
|   vme_geometry_scale_enabled_flag | u(1) |
|   vme_num_groups_minus1 | ue(v) |
|   vme_max_entities_minus1 | ue(v) |
|   vme_embedded_occupancy_flag | u(1) |
| } | |

In some examples, to support the constant depth patch per atlas functionality, an indicator (flag) (e.g., asme_patch_constant_depth_flag) is added to the asps_miv_extension( ). In some examples, when this indicator is set, geometry video is not present for the atlas, and its value is determined by the pdu_depth_start[rp] syntax element directly.

TABLE 4

| | Descriptor |
|---|---|
| asps_miv_extension( ) { | |
|   asme_group_id | u(v) |
|   asme_auxiliary_atlas_flag | u(1) |
|   asme_depth_occ_threshold_flag | u(1) |
|   if( vme_geometry_scale_enabled_flag == 1 ) { | |
|     asme_geometry_scale_factor_x_minus1 | u(v) |

TABLE 4-continued

| | Descriptor |
|---|---|
|     asme_geometry_scale_factor_y_minus1 | u(v) |
|   } | |
|   asme_patch_constant_depth_flag | u(1) |
| } | |

In the example Table 4 above, the asme_patch_constant_depth_flag set equal to 1 specifies that when vps_geometry_video_present_flag[atlasIdx] is equal to 0, the decoded depth is derived as disclosed herein. In some examples, the asme_patch_constant_depth_flag set equal to 0 specifies that when vps_geometry_video_present_flag[atlasIdx] is equal to 0, the depth is determined by external means.

The signaling of occupancy maps whether implicitly embedded within the depth or explicitly present in sub-bitstream (and how many bits are packed per component for the occupancy sub bitstream video) may be determined per atlas using the atlas sequence parameters set in the atlas data 1006 as follows in Table 5.

TABLE 5

| | Descriptor |
|---|---|
| miv_atlas_sequence_params( vuh_atlas_id ) { | |
|   ... | |
|   masp_occupancy_subbitstream_present_flag | u(1) |
|   if(masp_occupancy_subbitstream_present flag) | |
|     masp_occupancy_num_packed_bits | u(4) |
|   ... | |
| } | |

For example, the syntax element masp_occupancy_subbitstream_present_flag equal to 1 specifies that VPCC_OVD vpcc units may be present in the 3VC sequence. masp_occupancy_subbitstream_present_flag equal to 0 specifies that VPCC_OVD vpcc units are not present in the 3VC sequence. When not present, the value of masp_occupancy_subbitstream_present_flag is inferred to be equal to 0.

The syntax element masp_occupancy_num_packed_bits specify how many successive occupancy values are packed together as one sample. The size of the occupancy maps is reduced to become (AspsFrameFrameWidth[a]/masp_occupancy_num_packed_bits)×AspsFrameFrameHeight[a].

Furthermore, the correspondence information per patch may be defined as follows in Table 6.

TABLE 6

| | Descriptor |
|---|---|
| patch_data_unit(patchIdx) { | |
| ... | |
| pdu_correspondence_id | u(16) |
| ... | |
| } | |

For example, the syntax element pdu_correspondence_id specifies the corresponding patch id associated with the patch with index equal to patchIdx. If pdu_correspondence_id is not present, it is inferred to be 0xFFFF (e.g., not valid) meaning that there is no corresponding patch for the patch with index equal to patchIdx. In some embodiments, the correspondence information is signaled, in addition or in the alternative, within a dedicated SEI message per patch per atlas.

While an example manner of implementing the texture-based MIV encoder 500 is illustrated in FIG. 5, one or more of the elements, processes and/or devices illustrated in FIG. 5 may be combined, divided, re-arranged, omitted, eliminated and/or implemented in any other way. Further, the example view optimizer 502, the example depth inferencer 504, the example correspondence atlas constructor 506, the example correspondence labeler 508, the example correspondence pruner 510, the example mask aggregator 512, the example correspondence patch packer 514, the example atlas generator 516, the example occupancy packer 524, the example video encoder 534, the example video encoder 536 and/or, more generally, the example texture-based MIV encoder 500 of FIG. 5 may be implemented by hardware, software, firmware and/or any combination of hardware, software and/or firmware. Thus, for example, any of the example view optimizer 502, the example depth inferencer 504, the example correspondence atlas constructor 506, the example correspondence labeler 508, the example correspondence pruner 510, the example mask aggregator 512, the example correspondence patch packer 514, the example atlas generator 516, the example occupancy packer 524, the example video encoder 534, the example video encoder 536 and/or, more generally, the example texture-based MIV encoder 500 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, view optimizer 502, the example depth inferencer 504, the example correspondence atlas constructor 506, the example correspondence labeler 508, the example correspondence pruner 510, the example mask aggregator 512, the example correspondence patch packer 514, the example atlas generator 516, the example occupancy packer 524, the example video encoder 534, and/or the example video encoder 536 is/are hereby expressly defined to include a non-transitory computer readable storage device or storage disk such as a memory, a digital versatile disk (DVD), a compact disk (CD), a Blu-ray disk, etc. including the software and/or firmware. Further still, the example texture-based MIV encoder 500 of FIG. 5 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the texture-based MIV decoder 700 is illustrated in FIG. 7, one or more of the elements, processes and/or devices illustrated in FIG. 7 may be combined, divided, re-arranged, omitted, eliminated and/or implemented in any other way. Further, the example video decoder 708, the example video decoder 712, the example occupancy unpacker 714, the example MIV decoder and parser 718, the example block to patch map decoder 720, the example culler 728, the example renderer 730, the example controller 732, the example depth inferencer 734, the example synthesizer 736, the example inpainter 738 and/or, more generally, the example texture-based MIV decoder 700 of FIG. 7 may be implemented by hardware, software, firmware and/or any combination of hardware, software and/or firmware. Thus, for example, any of the example video decoder 708, the example video decoder 712, the example occupancy unpacker 714, the example MIV decoder and parser 718, the example block to patch map decoder 720, the example culler 728, the example renderer 730, the example controller 732, the example depth inferencer 734, the example synthesizer 736, the example inpainter 738 and/or, more generally, the example texture-based MIV decoder 700 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, video decoder 708, the example video decoder 712, the example occupancy unpacker 714, the example MIV decoder and parser 718, the example block to patch map decoder 720, the example culler 728, the example renderer 730, the example controller 732, the example depth inferencer 734, the example synthesizer 736, and/or the example inpainter 738 is/are hereby expressly defined to include a non-transitory computer readable storage device or storage disk such as a memory, a digital versatile disk (DVD), a compact disk (CD), a Blu-ray disk, etc. including the software and/or firmware. Further still, the example texture-based MIV decoder 700 of FIG. 7 may include one or more elements, processes and/or devices in addition to, or instead of, those illustrated in FIG. 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the texture-based MIV encoder 500 of FIG. 5 is shown in FIGS. 11-14. The machine readable instructions may be one or more executable programs or portion(s) of an executable program for execution by a computer processor and/or processor circuitry, such as the processor 1812 shown in the example processor platform 1800 discussed below in connection with FIG. 18. The program may be embodied in software stored on a non-transitory computer readable storage medium such as a CD-ROM, a floppy disk, a hard drive, a DVD, a Blu-ray disk, or a memory associated with the processor 1812, but the entire program and/or parts thereof could alternatively be executed by a device other than the processor 1812 and/or embodied in firmware or dedicated hardware. Further, although the example program is described with reference to the flowchart illustrated in FIG. 4, many other methods of implementing the example texture-based MIV encoder 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Figure 15:
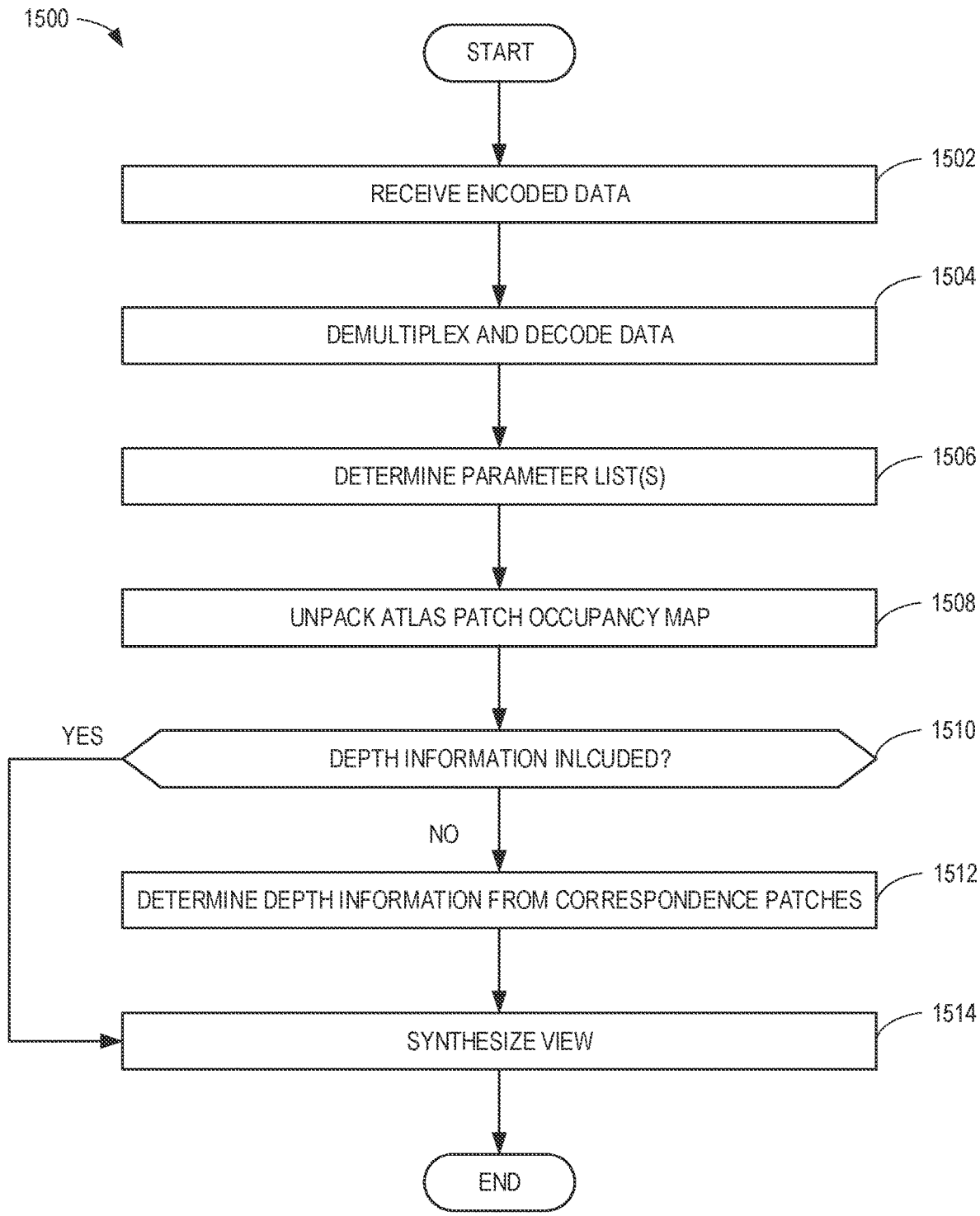
FIG. 15 is a flowchart representative of machine readable instructions which may be executed to implement the texture-based MIV decoder of FIG. 7.

A flowchart representative of example hardware logic, machine readable instructions, hardware implemented state machines, and/or any combination thereof for implementing the texture-based MIV decoder 700 of FIG. 7 is shown in FIG. 15. The machine readable instructions may be one or more executable programs or portion(s) of an executable program for execution by a computer processor and/or processor circuitry, such as the processor 1912 shown in the example processor platform 1900 discussed below in connection with FIG. 19. The program may be embodied in software stored on a non-transitory computer readable storage medium such as a CD-ROM, a floppy disk, a hard drive, a DVD, a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowchart illustrated in FIG. 4, many other methods of implementing the example texture-based MIV decoder 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 11-15 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 11:
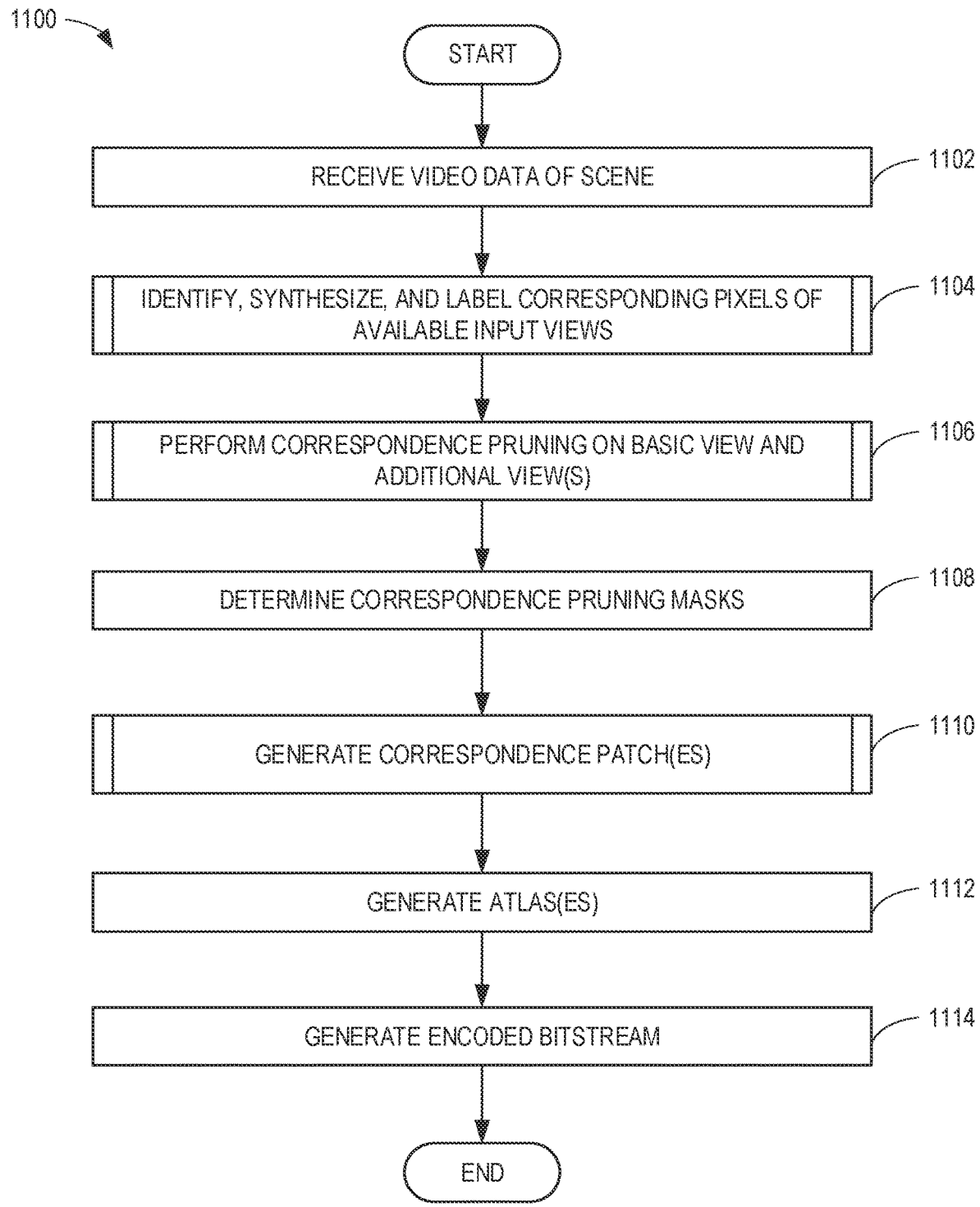
FIG. 11 is a flowchart representative of machine readable instructions which may be executed to implement the texture-based MIV encoder of FIG. 5.
Figure 12:
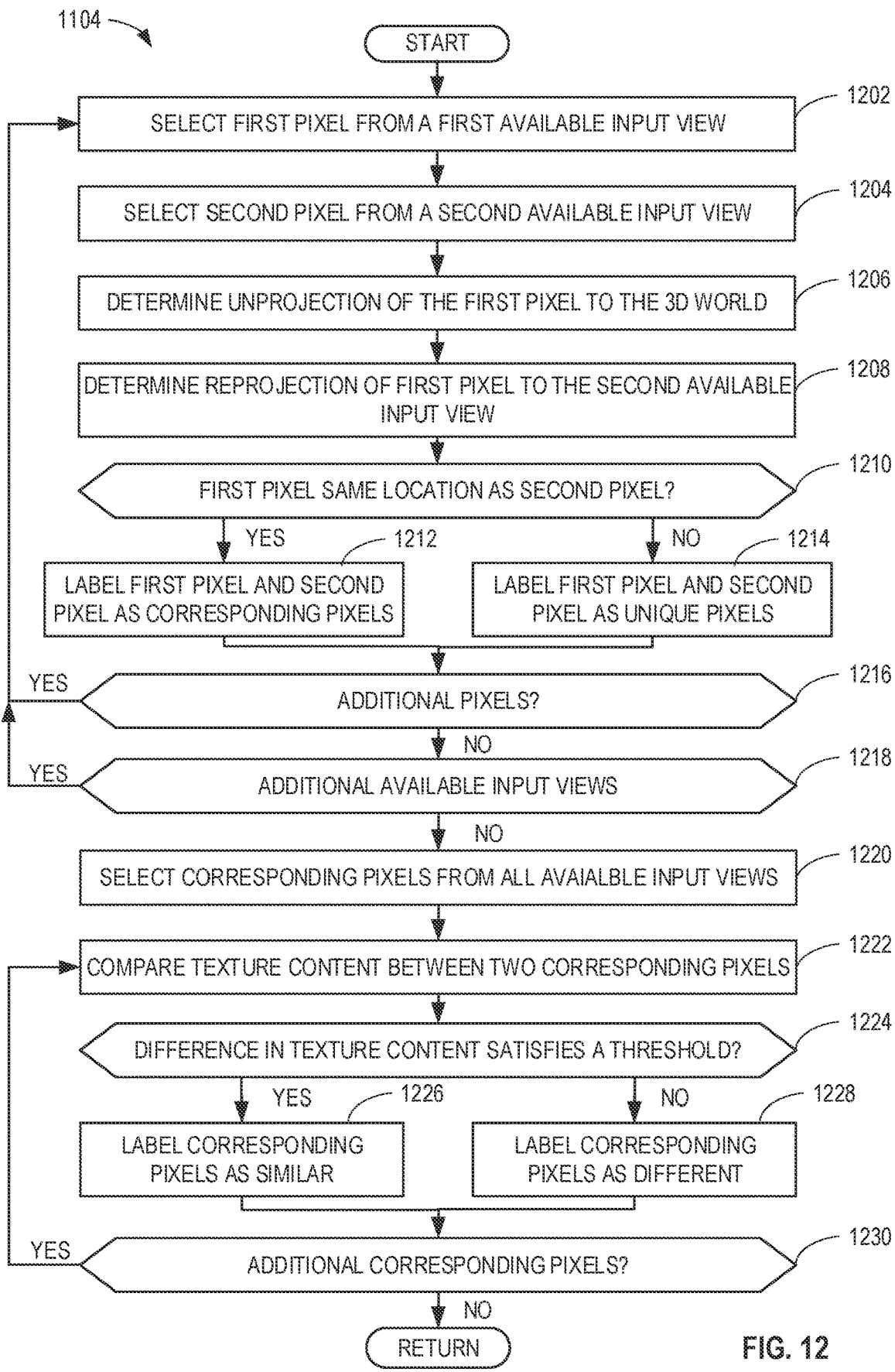
FIG. 12 is a flowchart representative of machine readable instructions which may be executed to implement an example correspondence labeler included in the texture-based MIV encoder of FIG. 5.

FIG. 11 is a flowchart representative of machine readable instructions which may be executed to implement the texture-based MIV encoder 500 of FIG. 5. The program 1100 of FIG. 11 begin execution at block 1102 at which the example view optimizer 502 (FIG. 5) receives video data of a scene. For example, the view optimizer 502 receives input views (e.g., source views 501 of FIG. 5) including texture maps. At block 1104, the example correspondence labeler 508 (FIG. 5) identifies, synthesizes, and labels corresponding pixels of available input views. For example, the correspondence labeler 508 identifies the corresponding pixels across all views (e.g., basic and/or additional views) and labels them based on the texture content. As described in further detail below, the example flowchart 1104 of FIG. 12 represents example machine readable instructions that may be implemented to identify, synthesize, and label the corresponding pixels of available input views.

Figure 13:
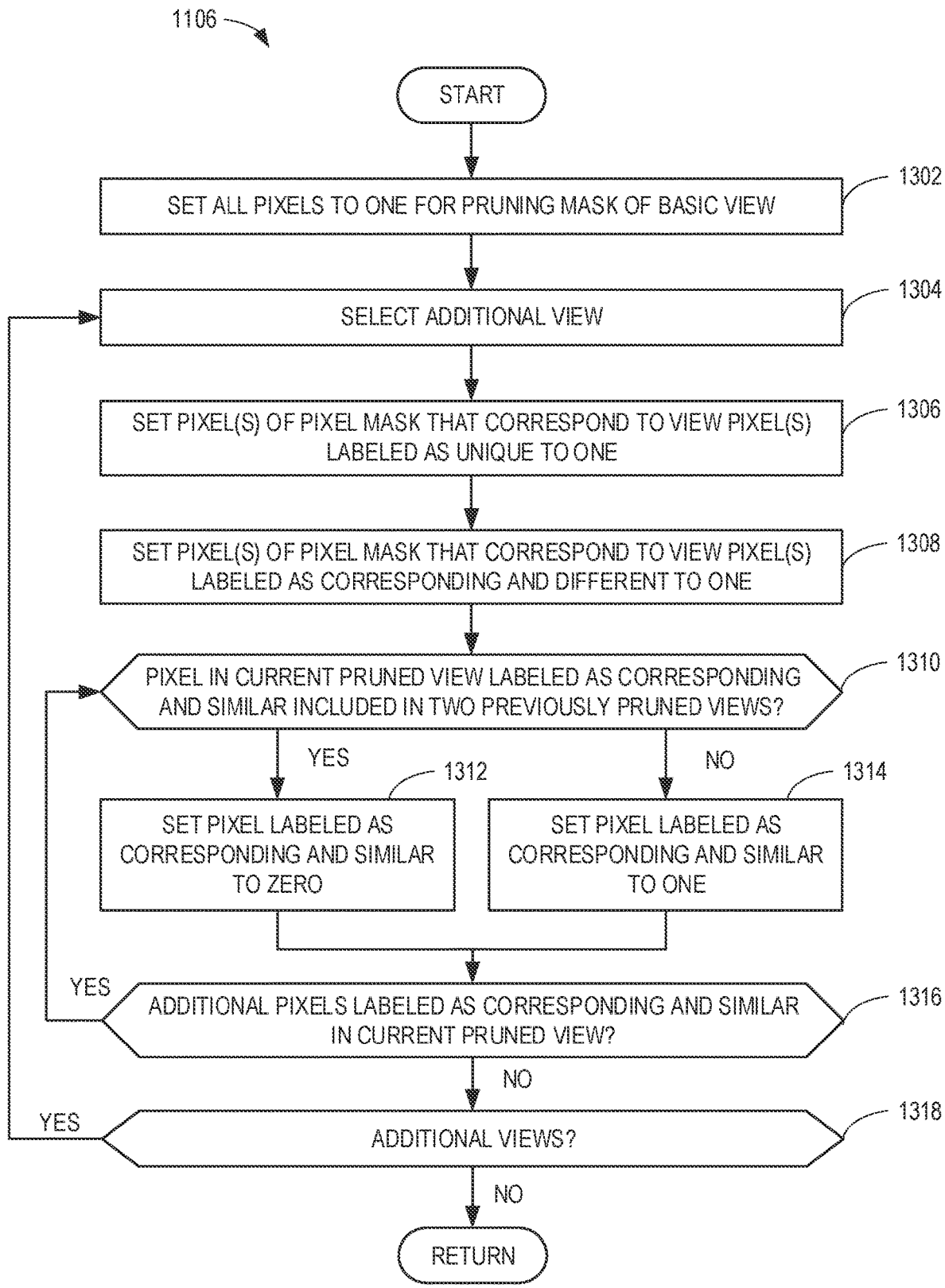
FIG. 13 is a flowchart representative of machine readable instructions which may be executed to implement an example correspondence pruner included in the texture-based MIV encoder of FIG. 5.

At block 1106, the example correspondence pruner 510 (FIG. 5) performs correspondence pruning on a basic view and additional view(s). For example, the correspondence pruner 510 prunes the basic view and additional view(s) based on the labelled pixels from the correspondence labeler 508. As described in further detail below, the example flowchart 1106 of FIG. 13 represents example machine readable instruction that may be implemented to perform correspondence pruning on the basic view and additional view(s). At block 1108, the example correspondence pruner 510 determines the correspondence pruning masks. For example, the correspondence pruner 510 outputs binary pruning masks (one per view) indicating if a pixel in a view is to be kept (e.g., pruning mask pixel set to "1") or removed (e.g. pruning mask pixel set to "0").

Figure 14:
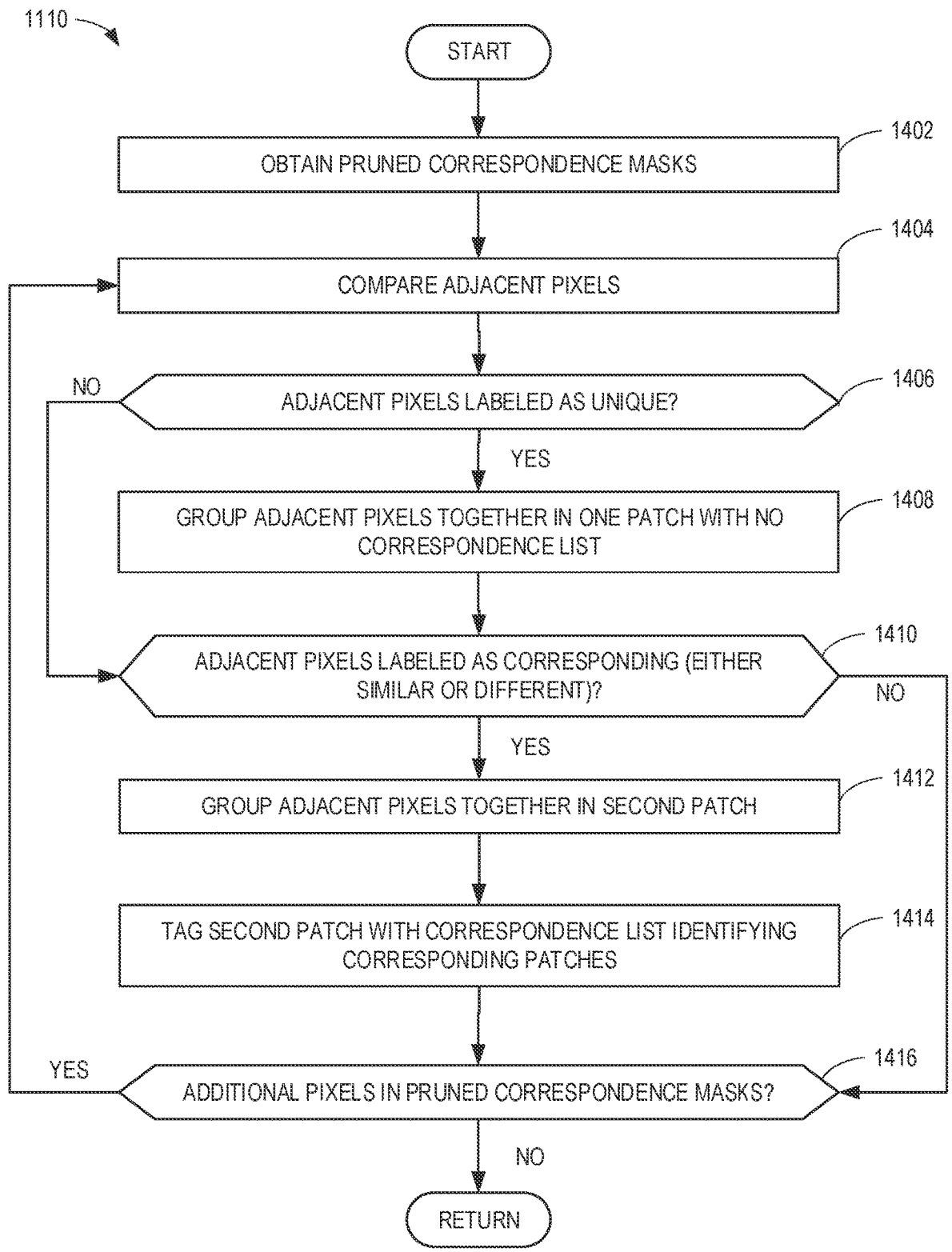
FIG. 14 is a flowchart representative of machine readable instructions which may be executed to implement an example correspondence patch packer included in the texture-based MIV encoder of FIG. 5.

At block 1110, the example correspondence patch packer 514 (FIG. 5) generates the correspondence patch(es). For example, the correspondence patch packer 514 extracts patches that can be tagged with the respective patch-wise correspondence lists which include patch identification (patch_ids) that identify corresponding patches. As described in further detail below, the example flowchart 1110 of FIG. 14 represents example machine readable instruction that may be implemented to generate the correspondence patch(es). At block 1112, the example atlas generator 516 (FIG. 5) generates atlas(es). For example, the atlas generator 516 writes the texture patches from the correspondence patch packer 514 into texture-only atlases (since no depth component exists for atlases in the texture-based MIV encoder 500).

At block 1114, the example texture-based MIV encoder 500 generates the encoded bitstream. For example, the video encoder 534 and the video encoder 536 generates encoded atlases from the occupancy video data 528 (FIG. 5) and the attribute (texture) video data 530 (FIG. 5), respectively. The video encoder 534 receives the example occupancy video data 528 and encodes the occupancy maps into the example HEVC bitstream 538 (FIG. 5). The video encoder 536 receives the example attribute (texture) video data 530 (including atlases) and encodes the texture components into the example HEVC bitstream 540 (FIG. 5). The example HEVC bitstream 538 includes patch parameters related to the decoded occupancy video data. Examples of such parameters include a map of patches between views and atlases, the packing order to reveal overlapped patches utilized to retrieve block to patch maps later, occupancy map, etc. The example HEVC bitstream 540 includes patch parameters related to the attribute (texture) video data. Examples of such parameters include a map of patches between views and atlases, the packing order to reveal overlapped patches utilized to retrieve block to patch maps later, etc. In some examples, the MIV data bitstream 532 includes a flag (or bit) to identify that the encoded video data (e.g., the HEVC bitstream 538 and the HEVC bitstream 540) does not include geometry (depth) information in the views/atlases. In examples disclosed herein, the packed occupancy maps in the occupancy video data 528 and the attribute (texture) video data 530 are video coded and multiplexed together along with the metadata included in the MIV data bitstream 532, which may be transmitted to a decoder (e.g., the example texture-based MIV decoder 700 of FIG. 7) and/or to a memory device for storage and eventual transmission to any number of decoders for decode and presentment to a user. After block 1114, program 1100 ends.

FIG. 12 is a flowchart representative of machine readable instructions which may be executed to implement an example correspondence labeler 508 (FIG. 5) included in the texture-based MIV encoder 500 of FIG. 5. The program 1104 of FIG. 12 begins execution at block 1202 at which the example correspondence labeler 508 selects a first pixel from a first available input view. At block 1204, the example correspondence labeler 508 selects a second pixel from a second available input view. For example, the correspondence labeler 508 selects a first pixel and a second pixel (the first pixel from a first available view and the second pixel from a second available view) from any available input views (e.g., basic and/or additional views) and labels them based on the texture content and depth information if available.

At block 1206, the example correspondence labeler 508 determines the unprojection of the first pixel to the 3D world. At block 1208, the example correspondence labeler 508 determines the reprojection of the first pixel to the second available input view. At block 1210, the example correspondence labeler 508 determines if the first pixel is in the same location as the second pixel. If the example correspondence labeler 508 determines the first pixel is in the same location as the second pixel, at block 1212, the example correspondence labeler 508 labels the first pixel and the second pixel as corresponding pixels. In examples disclosed herein, the first pixel and the second pixel are regarded as corresponding pixels if the unprojection of the first pixel from the first available input view to the 3D world and subsequent reprojection of the first pixel to the second available input view would place the first pixel in the same location as the second pixel from the second available input view. Returning to block 1210, if the example correspondence labeler 508 determines the first pixel is not in the same location as the second pixel, at block 1214, the example correspondence labeler 508 labels the first pixel and the second pixel as unique pixels. The correspondence labeler 508 labels pixels as "unique" if pixels from any available input view have no corresponding pixels in the other available input views. For example, pixels located in the edge regions of terminal cameras or in the occluded regions visible only by a specific view are typically labeled as "unique" pixels.

At block 1216, the example correspondence labeler 508 determines if there are additional pixels. If the example correspondence labeler 508 determines there are additional pixels, program 1104 returns to block 1202 at which the example correspondence labeler 508 selects a different pixel from the first available input view. Returning to block 1216, if the example correspondence labeler 508 determines there are no additional pixels, at block 1218, the example correspondence labeler 508 determines if there are additional available input views. If the example correspondence labeler 508 determines there are additional available input view, program 1104 returns to block 1202 at which the example correspondence labeler 508 selects a first pixel from a different available input view. Returning to block 1218, if the example correspondence labeler 508 determines there are not additional available input views, at block 1212, the example correspondence labeler 508 selects corresponding pixels from all available input views.

At block 1222, the example correspondence labeler 508 compares the texture content between two corresponding pixels. For example, for each of the corresponding pixels, the correspondence labeler 508 determines if the corresponding pixels have similar texture content. At block 1224, the example correspondence labeler 508 determines if the difference in the texture content satisfies a threshold. For example, the correspondence labeler 508 compares the texture content between the two corresponding pixels and compares the difference in the texture content to the threshold. In some examples, the threshold may be a difference in the color components (e.g., red-green-blue (RGB) components). For example, the threshold may be a difference of 5 (or some other value) between any one of the color components. If the example correspondence labeler 508 determines the difference in the texture content does satisfy a threshold, at block 1226, the example correspondence labeler 508 labels the corresponding pixels as similar. The correspondence labeler 508 determines that corresponding pixels have similar texture content when the difference in the texture content is below the threshold. The correspondence labeler 508 labels corresponding pixels as "similar texture" and stores the view IDs of the source views that include the corresponding pixels along with the coordinate (e.g., x, y) positions of the corresponding pixels into a correspondence list.

Returning to block 1224, if the example correspondence labeler 508 determines the difference in the texture content does not satisfy a threshold, at block 1228, the example correspondence labeler 508 labels the corresponding pixels as different. The correspondence labeler 508 determines the two corresponding pixels have different texture content when the difference in the texture content is above the threshold. In some examples, the corresponding pixels can be determined to have different texture content based on different specular information, different illumination/lighting information, color inconsistencies due to different camera settings, etc. The correspondence labeler 508 labels the corresponding pixels as "different texture" and stores the view IDs of the source views that include the corresponding pixels along with the coordinate (e.g., x, y) positions of the corresponding pixels into a correspondence list.

At block 1230, the example correspondence labeler 508 determines if there are additional corresponding pixels. If the example correspondence labeler 508 determines there are additional corresponding pixels, program 1104 returns to block 1220 at which the example correspondence labeler 508 compares the texture content between two different corresponding pixels. Returning to block 1230, if the example correspondence labeler 508 determines there are no additional corresponding pixels, program 1104 completes and returns to program 100 of FIG. 11.

FIG. 13 is a flowchart representative of machine readable instructions which may be executed to implement an example correspondence pruner 510 (FIG. 5) included in the texture-based MIV encoder 500 of FIG. 5. The program 1106 of FIG. 13 begins execution at block 1302 at which the example correspondence pruner 510 sets all pixels to one for the pruning mask of the basic view. The correspondence pruner 510 determines a pruning order according to given criteria (e.g., overlapped information between views, the distance between capturing cameras, etc.), which may be pre-determined, configurable, etc. In examples disclosed herein, the basic views are ordered first during pruning. For example, the first one of the basic views (e.g., selected based on one or more criteria) is kept unpruned and any other basic views and additional views included in the source views 501 (FIG. 5) may be pruned.

At block 1304, the example correspondence pruner 510 selects an additional view. For example, the correspondence pruner 510 selects an additional view from the source vides 501. At block 1306, the example correspondence pruner 510 sets pixel(s) of the pixel mask that correspond to view pixel(s) labeled as unique to 1 (e.g., to indicate the pixels are not to be pruned). At block 1308, the example correspondence pruner 510 sets pixel(s) of the pixel mask that correspond to view pixel(s) labeled as corresponding and different to 1 (e.g., to indicate the pixels are not to be pruned). The correspondence pruner 510 identifies the pixels labeled as "unique" and as "corresponding, different texture" by the correspondence labeler 508 for each of the other views and sets the pixels in the corresponding pruning masks for the views with the value 1. In some examples, the correspondence pruner 510 can choose to set a weighting scheme for the "corresponding, different texture" pixels such that those that belong to largely overlapping views are pruned away and views that are far from each other are kept. For example, views may be considered far from each other when the distance between the sources of the views (e.g., cameras) meet a threshold (e.g., 10 feet apart, 20 feet apart, etc.).

At block 1310, the example correspondence pruner 510 determines if a pixel in the current pruned view labeled as corresponding and similar is included in two previously pruned views. The correspondence pruner 510 searches the correspondence lists for the other views and identifies the pixels labeled as "corresponding, similar texture" by the correspondence labeler 508 for each of the other views. If the example correspondence pruner 510 determines if a pixel in the current pruned view labeled as corresponding and similar is included in two previously pruned views (e.g., the pixel in the two previously pruned view is set to 1), at block 1312, the example correspondence pruner 510 sets the pixel labeled as corresponding and similar to 0 (e.g., to indicate the pixels are to be pruned). In some examples, if at least two of the pixels included in the correspondence list belong to previously pruned views, then the correspondence pruner 510 keeps the pixels in the associated pruning mask at 0. Returning to block 1310, if the example correspondence pruner 510 determines if a pixel in the current pruned view labeled as corresponding and similar is not included in two previously pruned views (e.g., at least one of the two previously prune views does not include the pixel or the pixel in at least one of the two previously pruned view is set to 0), at block 1314, the example correspondence pruner 510 sets the pixel labelled as corresponding and similar to 1 (e.g., to indicate the pixels are not to be pruned). In some examples, at least two pixels labeled as "corresponding, similar texture" are selected and set to 1 in the associated pruning mask to be used by an example decoder to infer depth information.

At block 1316, the example correspondence pruner 510 determines if there are additional pixels labeled as corresponding and similar in the current pruned view. If the example correspondence pruner 510 determines there are additional pixels labeled as corresponding and similar in the current pruned view, program 1106 returns to block 1310 at which the example correspondence pruner 510 determines if a pixel in the current pruned view labeled as corresponding and similar is included in two previously pruned views. Returning to block 1316, if the example correspondence pruner 510 determines there are no additional pixels labeled as corresponding and similar in the current pruned view, at block 1318, the example correspondence pruner 510 determines if there are additional views. If the example correspondence pruner 510 determines there are additional views, program 1106 returns to block 1310 at which the example correspondence pruner 510 determines if a pixel in the current pruned view labeled as corresponding and similar is included in two previously pruned views. Returning to block 1318, if the example correspondence pruner 510 determines there are no additional views, program 1106 completes and returns to program 1100 of FIG. 11.

FIG. 14 is a flowchart representative of machine readable instructions which may be executed to implement an example correspondence patch packer 514 (FIG. 5) included in the texture-based MIV encoder 500 of FIG. 5. The program 1110 of FIG. 14 begins execution at block 1402 at which the example correspondence patch packer 514 obtains pruned correspondence masks from the example correspondence pruner 510 (FIG. 5).

At block 1404, the example correspondence patch packer 514 compares adjacent pixels in the pruned correspondence masks. For example, the correspondence patch packer 514 compares the labels of the adjacent pixels in the pruned correspondence masks. At block 1406, the example correspondence patch packer 514 determines if the adjacent pixels are labeled as unique. For example, the correspondence patch packer 514 identifies adjacent pixels at a given aggregated pruned mask that have no correspondence (e.g., the adjacent pixels are both labeled as "unique" in the pruned correspondence mask). If the example correspondence patch packer 514 determines the adjacent pixels are labeled as unique, at block 1408, the example correspondence patch packer 514 groups the adjacent pixels together in one patch with no correspondence list. For example the correspondence patch packer 514 groups the adjacent pixels in the given aggregated pruned correspondence mask that have no correspondence (e.g., the adjacent pixels are both labeled as "unique") into one patch, and the patch is associated with an empty patch-wise correspondence list.

Returning to block 1406, if the example correspondence patch packer 514 determines the adjacent pixels are not labeled as unique, at block 1410, the example correspondence patch packer 514 determines if the adjacent pixels are labeled as corresponding (either similar or different). For example, the correspondence patch packer 514 identifies the adjacent pixels at a given aggregated pruned mask that are labeled as "corresponding, similar texture" or "corresponding, different texture." If the example correspondence patch packer 514 determines the adjacent pixels are labeled as corresponding (either similar or different), at block 1412, the example correspondence patch packer 514 groups the adjacent pixels together in a second patch. Returning to block 1410, if the example correspondence patch packer 514 determines the adjacent pixels are not labeled as corresponding (either similar or different), at block 1416, the example correspondence patch packer 514 determines if there are additional pixels in the pruned correspondence masks.

At block 1414, the example correspondence patch packer 514 tags the second patch with a correspondence list identifying corresponding patches. For example, the correspondence patch packer 514 tags the second patch in the given aggregated pruned correspondence mask with patch-wise correspondence list that indicate the patch_ids of the corresponding patches. The correspondence patch packer 514 also groups the associated pixels in all other aggregated pruned correspondence masks into one patch together per view (e.g., the second patch), which results in multiple correspondence patches.

At block 1416, the example correspondence patch packer 514 determines if there are additional pixels in the pruned correspondence masks. If the example correspondence patch packer 514 determines there are additional pixels in the pruned correspondence masks, program 1110 returns to block 1404 at which the example correspondence patch packer 514 compares different adjacent pixels in the pruned correspondence masks. Returning to block 1416, if the example correspondence patch packer 514 determines there are not additional pixels in the pruned correspondence masks, program 1110 completes and returns to program 1100 of FIG. 11.

FIG. 15 is a flowchart representative of machine readable instructions which may be executed to implement the texture-based MIV decoder 700 of FIG. 7. The program 1500 of FIG. 15 begins execution at block 1502 at which the example texture-based MIV decoder 700 (FIG. 7) receives encoded data. For example, the texture-based MIV decoder 700 receives the example HEVC bitstream 540, the example HEVC bitstream 538, and the example MIV data bitstream 532 generated by the example texture-based MIV encoder 500 (FIG. 5). At block 1504, the example texture-based MIV decoder 700 demultiplexes and decodes the encoded data. For example, the video decoder 708 (FIG. 7) and the video decoder 712 (FIG. 7) decode encoded atlases to produce decoded atlases including texture and occupancy data. In some examples, the HEVC bitstream 540 includes patch parameters related to the attribute (texture) video data. Examples of such parameters include a map of patches between views and atlases, the packing order to reveal overlapped patches utilized to retrieve block to patch maps later, etc. The video decoder 708 generates a sequence of decoded texture atlases (e.g., the decoded texture pictures 710). In some examples, the HEVC bitstream 538 includes patch parameters related to the decoded occupancy video data. Examples of such parameters include a map of patches between views and atlases, the packing order to reveal overlapped patches utilized to retrieve block to patch maps later, occupancy map, etc. The video decoder 712 decodes the occupancy atlases.

At block 1506, the example MIV decoder and parser 718 determines parameter lists. For example, the MIV decoder and parser 718 (FIG. 7) receives the MIV data bitstream 532. The example MIV decoder and parser 718 parses the MIV data bitstream 532 to generate example atlas data 722 (FIG. 7) and an example Video-based Point Cloud Compression (V-PCC) and viewpoint parameter set 724 (FIG. 7). For example, the MIV decoder and parser 718 parses the encoded MIV data bitstream 532 for the example patch list, camera parameter list, etc. At block 1508, the example occupancy unpacker 714 (FIG. 7) unpacks an atlas patch occupancy map. For example, the occupancy unpacker 714 reverses the packing process to retrieve the occupancy maps 716 (FIG. 7) of the same size as the texture atlases of the decoded texture pictures 710 (FIG. 7).

At block 1510, the example MIV decoder and parser 718 determines if depth information is included in the encoded bitstreams. For example, the MIV decoder and parser 718 determines if the atlas data 722 (FIG. 7) includes an indicator (e.g., a flag, a bit, etc.) that indicates if the depth information is included in the encoded bitstreams (e.g., the HEVC bitstream 540, the HEVC bitstream 538, and the MIV data bitstream 532). If the example MIV decoder and parser 718 determines there is depth information included, at block 1514, the example renderer 730 synthesizes a view. For example, the synthesizer 736 (FIG. 7) synthesizes a scene based on the atlases (texture and depth), the occupancy map, and/or the parameters. After block 1514, program 1500 ends.

Returning to block 1510, if the example MIV decoder and parser 718 determines there is no depth information included, at block 1512, the example renderer 730 determines the depth information from correspondence patches. For examples, the depth inferencer 734 infers the depth information using the correspondence patches of the texture atlases. After block 1512, the program 1500 continues to block 1514 at which the example renderer 730 synthesizes a view. For example, the synthesizer 736 synthesizes a scene based on the texture atlases, the occupancy map, the inferred depth information, and/or the parameters. After block 1514, program 1500 ends.

Figure 16:
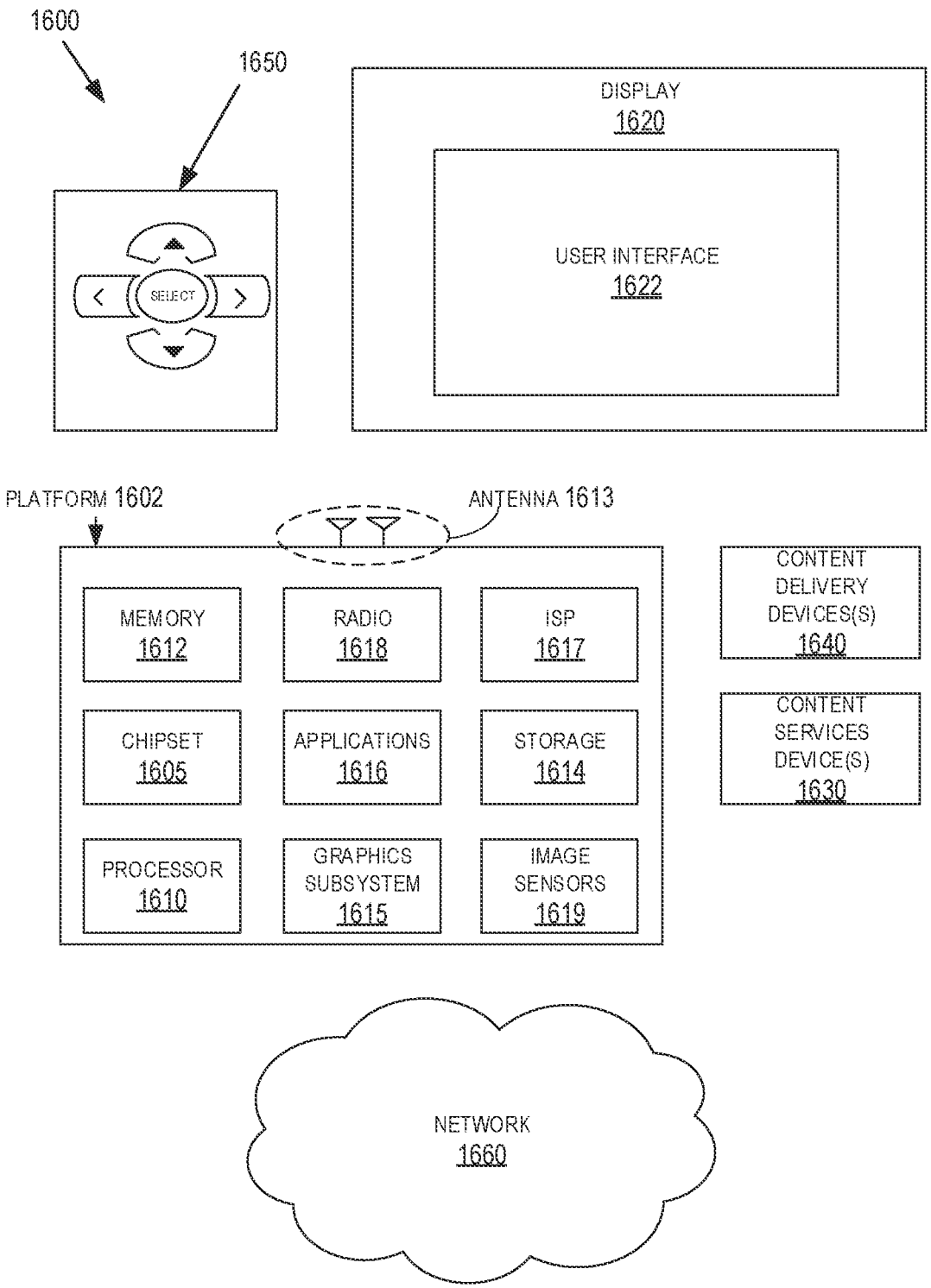
FIG. 16 is an illustrative diagram of an example system in accordance with at least some implementations of this disclosure.
Figure 17:
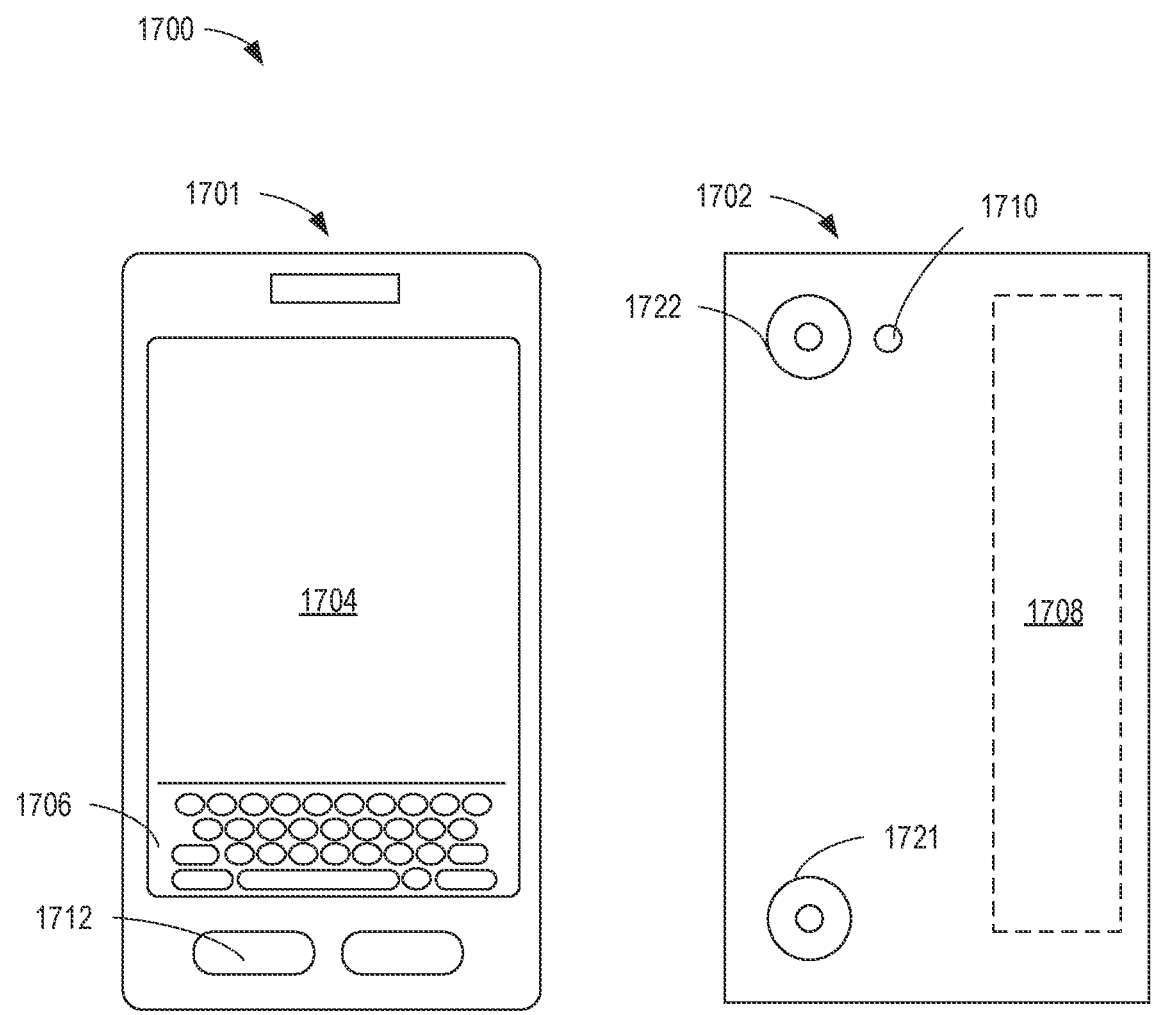
FIG. 17 illustrates an example device, all arranged in accordance with at least some implementations of this disclosure.

FIGS. 16-17 illustrate example systems and devices for implementing the discussed techniques, encoders (e.g., the MIV encoder 100 of FIG. 1, the texture-based MIV encoder 500 of FIG. 5, etc.), and decoders (e.g., the MIV decoder 300 of FIG. 3, the texture-based MIV decoder 700 of FIG. 7). For example, any encoder (encoder system), decoder (decoder system), or bitstream extractor discussed herein may be implemented via the system illustrated in FIG. 16 and/or the device implemented in FIG. 17. In some examples, the discussed techniques, encoders (e.g., the MIV encoder 100 of FIG. 1, the texture-based MIV encoder 500 of FIG. 5, etc.), and decoders (e.g., the MIV decoder 300 of FIG. 3, the texture-based MIV decoder 700 of FIG. 7) may be implemented via any suitable device or platform discussed herein such as a personal computer, a laptop computer, a tablet, a phablet, a smart phone, a digital camera, a gaming console, a wearable device, a display device, an all-in-one device, a two-in-one device, or the like.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used herein, the term "module" refers to any combination of software logic, firmware logic, hardware logic, and/or circuitry configured to provide the functionality described herein. The software may be embodied as a software package, code and/or instruction set or instructions, and "hardware", as used herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

FIG. 16 is an illustrative diagram of an example system 1600, arranged in accordance with at least some implementations of the present disclosure. In some examples, system 1600 may be a mobile device system although system 1600 is not limited to this context. For example, system 1600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In some examples, system 1600 includes a platform 1602 coupled to a display 1620. Platform 1602 may receive content from a content device such as content services device(s) 1630 or content delivery device(s) 1640 or other content sources such as image sensors 1619. For example, platform 1602 may receive image data as discussed herein from image sensors 1619 or any other content source. A navigation controller 1650 including one or more navigation features may be used to interact with, for example, platform 1602 and/or display 1620. Each of these components is described in greater detail below.

In some examples, platform 1602 may include any combination of a chipset 1605, processor 1610, memory 1612, antenna 1613, storage 1614, graphics subsystem 1615, applications 1616, image signal processor 1617 and/or radio 1618. Chipset 1605 may provide intercommunication among processor 1610, memory 1612, storage 1614, graphics subsystem 1615, applications 1616, image signal processor 1617 and/or radio 1618. For example, chipset 1605 may include a storage adapter (not depicted) capable of providing intercommunication with storage 1614.

Processor 1610 may be implemented as a Complex Instruction Set Computer (CISC) or Reduced Instruction Set Computer (RISC) processors, x86 instruction set compatible processors, multi-core, or any other microprocessor or central processing unit (CPU). In some examples, processor 1610 may be dual-core processor(s), dual-core mobile processor(s), and so forth.

Memory 1612 may be implemented as a volatile memory device such as, but not limited to, a Random Access Memory (RAM), Dynamic Random Access Memory (DRAM), or Static RAM (SRAM).

Storage 1614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some examples, storage 1614 may include technology to increase the storage performance enhanced protection for valuable digital media when multiple hard drives are included, for example.

Image signal processor 1617 may be implemented as a specialized digital signal processor or the like used for image processing. In some examples, image signal processor 1617 may be implemented based on a single instruction multiple data or multiple instruction multiple data architecture or the like. In some examples, image signal processor 1617 may be characterized as a media processor. As discussed herein, image signal processor 1617 may be implemented based on a system on a chip architecture and/or based on a multi-core architecture.

Graphics subsystem 1615 may perform processing of images such as still or video for display. Graphics subsystem 1615 may be a graphics processing unit (GPU) or a visual processing unit (VPU), for example. An analog or digital interface may be used to communicatively couple graphics subsystem 1615 and display 1620. For example, the interface may be any of a High-Definition Multimedia Interface, DisplayPort, wireless HDMI, and/or wireless HD compliant techniques. Graphics subsystem 1615 may be integrated into processor 1610 or chipset 1605. In some implementations, graphics subsystem 1615 may be a stand-alone device communicatively coupled to chipset 1605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1618 may operate in accordance with one or more applicable standards in any version.

In some examples, display 1620 may include any television type monitor or display. Display 1620 may include, for example, a computer display screen, touch screen display, video monitor, television-like device, and/or a television. Display 1620 may be digital and/or analog. In some examples, display 1620 may be a holographic display. Also, display 1620 may be a transparent surface that may receive a visual projection. Such projections may convey various forms of information, images, and/or objects. For example, such projections may be a visual overlay for a mobile augmented reality (MAR) application. Under the control of one or more software applications 1616, platform 1602 may display user interface 1622 on display 1620.

In some examples, content services device(s) 1630 may be hosted by any national, international and/or independent service and thus accessible to platform 1602 via the Internet, for example. Content services device(s) 1630 may be coupled to platform 1602 and/or to display 1620. Platform 1602 and/or content services device(s) 1630 may be coupled to a network 1660 to communicate (e.g., send and/or receive) media information to and from network 1660. Content delivery device(s) 1640 also may be coupled to platform 1602 and/or to display 1620.

Image sensors 1619 may include any suitable image sensors that may provide image data based on a scene. For example, image sensors 1619 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1619 may include any device that may detect information of a scene to generate image data.

In some examples, content services device(s) 1630 may include a cable television box, personal computer, network, telephone, Internet enabled devices or appliance capable of delivering digital information and/or content, and any other similar device capable of uni-directionally or bi-directionally communicating content between content providers and platform 1602 and/display 1620, via network 1660 or directly. It will be appreciated that the content may be communicated uni-directionally and/or bi-directionally to and from any one of the components in system 1600 and a content provider via network 1660. Examples of content may include any media information including, for example, video, music, medical and gaming information, and so forth.

Content services device(s) 1630 may receive content such as cable television programming including media information, digital information, and/or other content. Examples of content providers may include any cable or satellite television or radio or Internet content providers. The provided examples are not meant to limit implementations in accordance with the present disclosure in any way.

In some examples, platform 1602 may receive control signals from navigation controller 1650 having one or more navigation features. The navigation features of navigation controller 1650 may be used to interact with user interface 1622, for example. In various embodiments, navigation controller 1650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1650 may be replicated on a display (e.g., display 1620) by movements of a pointer, cursor, focus ring, or other visual indicators displayed on the display. For example, under the control of software applications 1616, the navigation features located on navigation controller 1650 may be mapped to virtual navigation features displayed on user interface 1622, for example. In various embodiments, navigation controller 1650 may not be a separate component but may be integrated into platform 1602 and/or display 1620. The present disclosure, however, is not limited to the elements or in the context shown or described herein.

In some examples, drivers (not shown) may include technology to enable users to instantly turn on and off platform 1602 like a television with the touch of a button after initial boot-up, when enabled, for example. Program logic may allow platform 1602 to stream content to media adaptors or other content services device(s) 1630 or content delivery device(s) 1640 even when the platform is turned "off." In addition, chipset 1605 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In some examples, any one or more of the components shown in system 1600 may be integrated. For example, platform 1602 and content services device(s) 1630 may be integrated, or platform 1602 and content delivery device(s) 1640 may be integrated, or platform 1602, content services device(s) 1630, and content delivery device(s) 1640 may be integrated, for example. In various embodiments, platform 1602 and display 1620 may be an integrated unit. Display 1620 and content service device(s) 1630 may be integrated, or display 1620 and content delivery device(s) 1640 may be integrated, for example. These examples are not meant to limit the present disclosure.

In various embodiments, system 1600 may be implemented as a wireless system, a wired system, or a combination of both. When implemented as a wireless system, system 1600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 16.

As described above, system 1600 may be embodied in varying physical styles or form factors. FIG. 17 illustrates an example small form factor device 1700, arranged in accordance with at least some implementations of the present disclosure. In some examples, system 1600 may be implemented via device 1700. In other examples, other systems, components, or modules discussed herein or portions thereof may be implemented via device 1700. In various embodiments, for example, device 1700 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. pointand-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 17, device 1700 may include a housing with a front 1701 and a back 1702. Device 1700 includes a display 1704, an input/output (I/O) device 1706, a color camera 1721, a color camera 1722, and an integrated antenna 1708. In some embodiments, color camera 1721 and color camera 1722 attain planar images as discussed herein. In some embodiments, device 1700 does not include color camera 1721 and 1722 and device 1700 attains input image data (e.g., any input image data discussed herein) from another device. Device 1700 also may include navigation features 1712. I/O device 1706 may include any suitable I/O device for entering information into a mobile computing device. Examples for I/O device 1706 may include an alphanumeric keyboard, a numeric keypad, a touch pad, input keys, buttons, switches, microphones, speakers, voice recognition device and software, and so forth. Information also may be entered into device 1700 by way of microphone (not shown) or may be digitized by a voice recognition device. As shown, device 1700 may include color cameras 1721, 1722, and a flash 1710 integrated into back 1702 (or elsewhere) of device 1700. In other examples, color cameras 1721, 1722, and flash 1710 may be integrated into front 1701 of device 1700 or both front and back sets of cameras may be provided. Color cameras 1721, 1722 and a flash 1710 may be components of a camera module to originate color image data with IR texture correction that may be processed into an image or streaming video that is output to display 1704 and/or communicated remotely from device 1700 via antenna 1708 for example.

Example embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some examples, one or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

Figure 18:
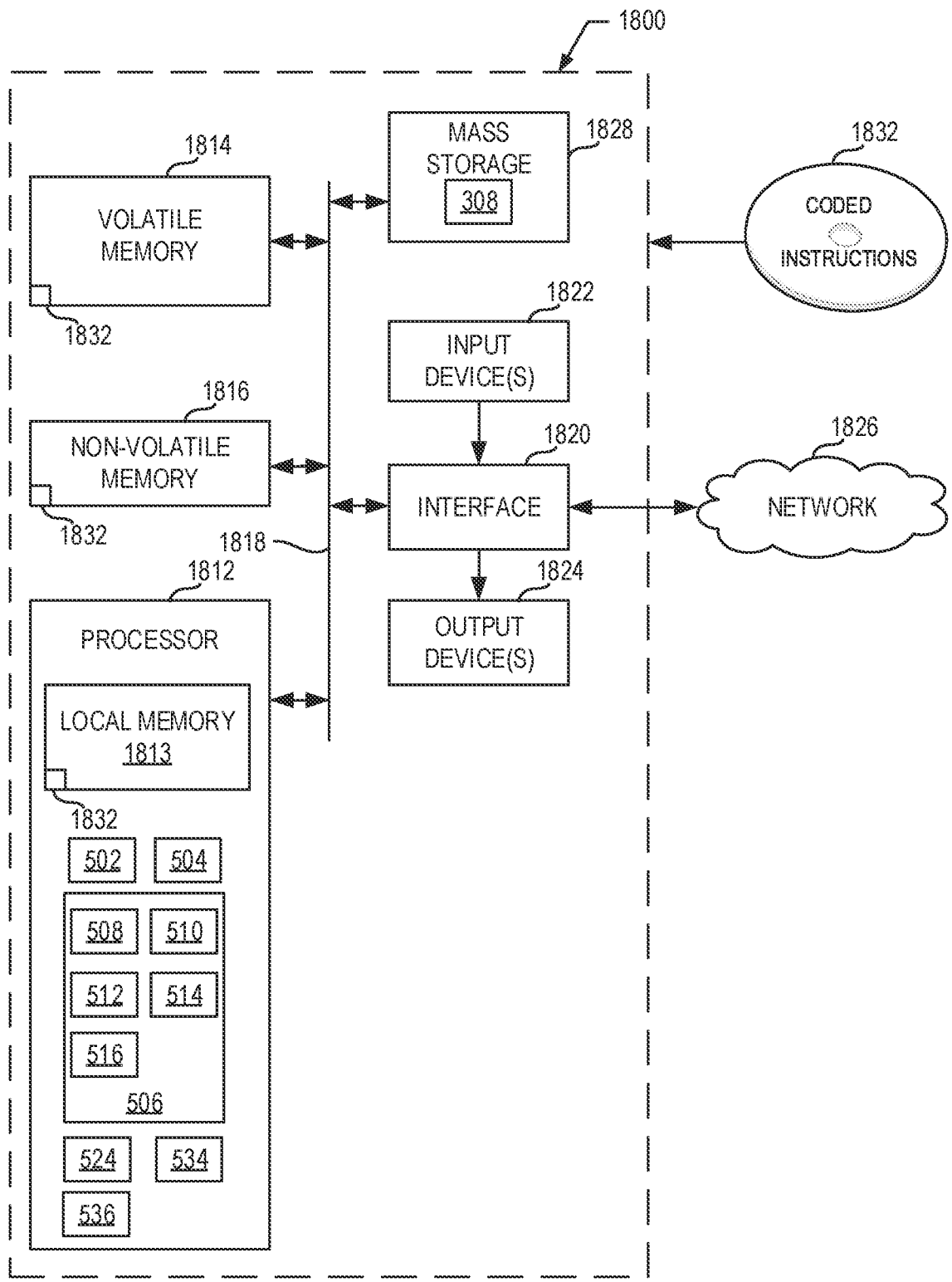
FIG. 18 is a block diagram of an example processing platform structured to execute the instructions of FIGS. 11, 12, 13, and 14 to implement the texture-based MIV encoder of FIG. 5.

FIG. 18 is a block diagram of an example processor platform 1800 structured to execute the instructions of FIGS. 11-14 to implement the texture-based MIV encoder 500 of FIG. 5. The processor platform 1800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements view optimizer 502, the example depth inferencer 504, the example correspondence atlas constructor 506, the example correspondence labeler 508, the example correspondence pruner 510, the example mask aggregator 512, the example correspondence patch packer 514, the example atlas generator 516, the example occupancy packer 524, the example video encoder 534, and the example video encoder 536.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), a Bluetooth® interface, a near field communication (NFC) interface, and/or a PCI express interface.

In the illustrated example, one or more input devices 1822 are connected to the interface circuit 1820. The input device(s) 1822 permit(s) a user to enter data and/or commands into the processor 1812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1820 of the illustrated example, thus, typically includes a graphics driver card, a graphics driver chip and/or a graphics driver processor.

The interface circuit 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, redundant array of independent disks (RAID) systems, and digital versatile disk (DVD) drives.

The machine executable instructions 1832 of FIGS. 11-14 may be stored in the mass storage device 1828, in the volatile memory 1814, in the non-volatile memory 1816, and/or on a removable non-transitory computer readable storage medium such as a CD or DVD.

Figure 19:
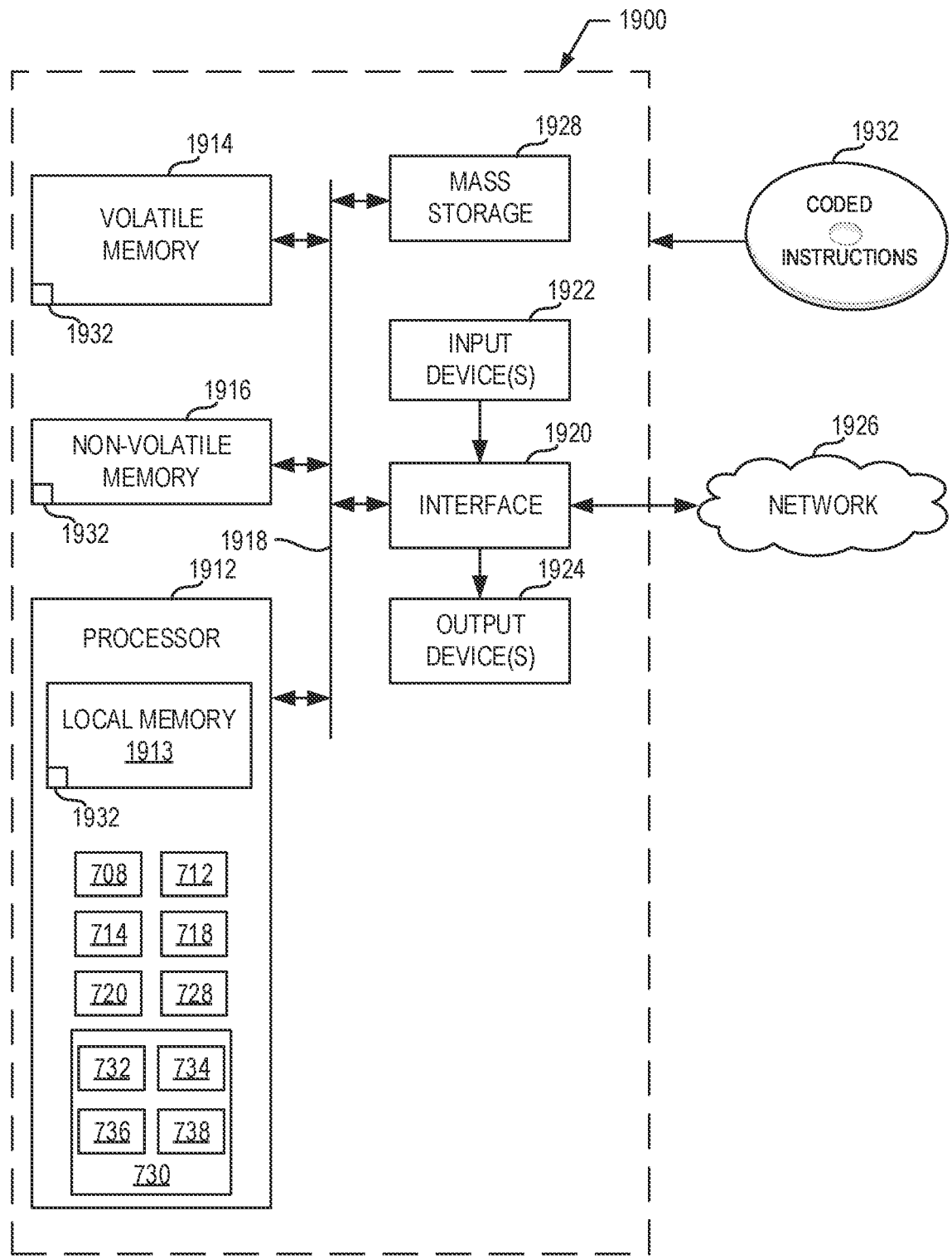
FIG. 19 is a block diagram of an example processing platform structured to execute the instructions of FIG. 15 to implement the texture-based MIV decoder of FIG. 7.

FIG. 19 is a block diagram of an example processor platform 1900 structured to execute the instructions of FIG. 15 to implement the texture-based MIV decoder 700 of FIG. 7. The processor platform 1900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements video decoder 708, the example video decoder 712, the example occupancy unpacker 714, the example MIV decoder and parser 718, the example block to patch map decoder 720, the example culler 728, the example renderer 730, the example controller 732, the example depth inferencer 734, the example synthesizer 736, and the example inpainter 738.

The processor 1912 of the illustrated example includes a local memory 1913 (e.g., a cache). The processor 1912 of the illustrated example is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), a Bluetooth® interface, a near field communication (NFC) interface, and/or a PCI express interface.

In the illustrated example, one or more input devices 1922 are connected to the interface circuit 1920. The input device(s) 1922 permit(s) a user to enter data and/or commands into the processor 1912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1920 of the illustrated example, thus, typically includes a graphics driver card, a graphics driver chip and/or a graphics driver processor.

The interface circuit 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, redundant array of independent disks (RAID) systems, and digital versatile disk (DVD) drives.

The machine executable instructions 1932 of FIG. 15 may be stored in the mass storage device 1928, in the volatile memory 1914, in the non-volatile memory 1916, and/or on a removable non-transitory computer readable storage medium such as a CD or DVD.

Figure 20:
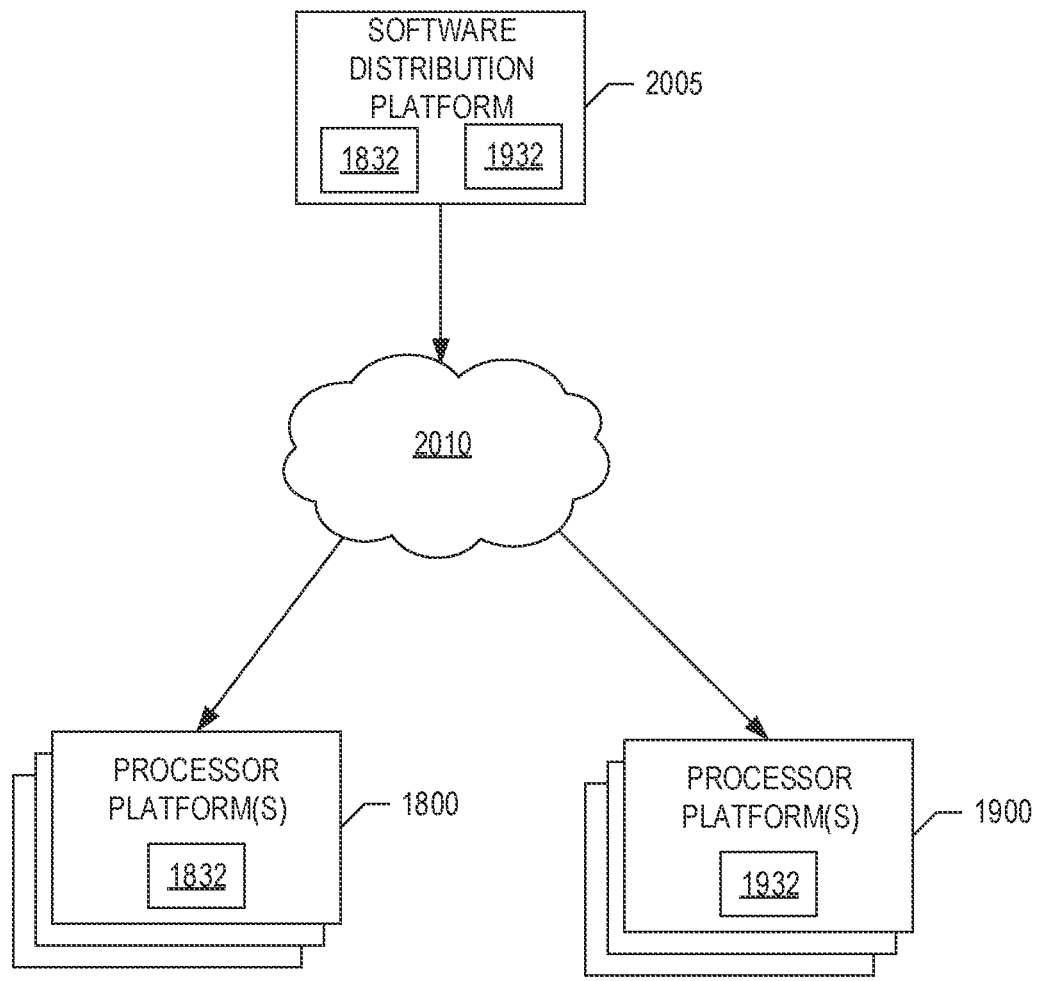
FIG. 20 is a block diagram of an example software distribution platform to distribute software (e.g., software corresponding to the example computer readable instructions of FIGS. 11, 12, 13, 14, and 15) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 2005 to distribute software such as the example computer readable instructions 1832 of FIG. 18 and/or the example computer readable instructions 1932 of FIG. 19 to third parties is illustrated in FIG. 20. The example software distribution platform 2005 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1832 of FIG. 18 and/or the example computer readable instructions 1932 of FIG. 19. The third parties may be consumers, users, retailers, OEMs, etc., who purchase and/or license the software for use and/or re-sale and/or sub-licensing. In the illustrated example, the software distribution platform 2005 includes one or more servers and one or more storage devices. The storage devices store the computer readable instructions 1832 and/or 1932, which may correspond to the example computer readable instructions 1832 of FIG. 18 and/or the example computer readable instructions 1932 of FIG. 19, as described above. The one or more servers of the example software distribution platform 2005 are in communication with a network 2010, which may correspond to any one or more of the Internet and/or any of the example networks 1826, 1926 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1832 and/or 1932 from the software distribution platform 2005. For example, the software, which may correspond to the example computer readable instructions 1832 of FIG. 18, may be downloaded to the example processor platform 1800, which is to execute the computer readable instructions 1832 to implement the texture-based MIV encoder 500 of FIG. 5. For example, the software, which may correspond to the example computer readable instructions 1932 of FIG. 19, may be downloaded to the example processor platform 1900, which is to execute the computer readable instructions 1932 to implement the texture-based MIV decoder 700 of FIG. 7. In some example, one or more servers of the software distribution platform 2005 periodically offer, transmit, and/or force updates to the software (e.g., the example computer readable instructions 1832 of FIG. 18 and/or the example computer readable instructions 1932 of FIG. 19) to ensure improvements, patches, updates, etc. are distributed and applied to the software at the end user devices.

From the foregoing, it will be appreciated that example methods, apparatus and articles of manufacture have been disclosed that enable texture based immersive video coding. The disclosed methods, apparatus and articles of manufacture improve the efficiency of using a computing device by determining and assigning corresponding patches in a correspondence list. For example, a texture-based encoder stores a list of corresponding patches in an atlas. The texture-based encoder identifies the corresponding patches to infer depth information from different texture information between views. The texture-based encoder requires less bandwidth to transmit encoded bitstreams since the texture-based encoder does not transmit any depth atlases. A texture-based decoder requires relatively low bandwidth to identify the corresponding patches of interest because of the list of corresponding patches included in the atlas(es) from the texture-based encoder. The disclosed methods, apparatus and articles of manufacture are accordingly directed to one or more improvement(s) in the functioning of a computer.

Example methods, apparatus, systems, and articles of manufacture for texture based immersive video coding are disclosed herein. Further examples and combinations thereof include the following:

Example 1 includes a video encoder comprising a correspondence labeler to (i) identify first unique pixels and first corresponding pixels included in a plurality of pixels of a first view and (ii) identify second unique pixels and second corresponding pixels included in a plurality of pixels of a second view, ones of the first corresponding pixels having respective correspondence relationships with ones of the second corresponding pixels, a first one of the first corresponding pixels and a second one of the second corresponding pixels to be classified as having at least one of similar texture information or different texture information, a correspondence patch packer to (i) compare adjacent pixels in the first view and (ii) identify a first patch of unique pixels and a second patch of corresponding pixels based on the comparison of the adjacent pixels and the correspondence relationships, the second patch tagged with a correspondence list identifying corresponding patches in the second view, and an atlas generator to generate at least one atlas to include in encoded video data, the at least one atlas including the first patch of unique pixels and the second patch of corresponding pixels, the encoded video data not including depth maps.

Example 2 includes the video encoder of example 1, further including a correspondence pruner to generate a first pruning mask for the first view, the first pruning mask based on texture information from the first unique pixels and the first corresponding pixels.

Example 3 includes the video encoder of example 2, wherein the first corresponding pixels do not include corresponding pixels included in a previous pruned view.

Example 4 includes the video encoder of any one of example 2 or example 3, wherein the correspondence pruner is to generate a second pruning mask for the second view, the second pruning mask based on texture information from the second unique pixels and the second corresponding pixels.

Example 5 includes the video encoder of example 4, wherein the second corresponding pixels include corresponding pixels included in the first corresponding pixels of the first view.

Example 6 includes the video encoder of any one of example 4 or example 5, wherein the correspondence pruner is to generate a third pruning mask for a third view, the third pruning mask based on texture information from third unique pixels and third corresponding pixels, the third corresponding pixels including corresponding pixels included in the first corresponding pixels of the first view and second corresponding pixels of the second view.

Example 7 includes the video encoder of example 6, wherein the correspondence pruner is to generate the first pruning mask, the second pruning mask, and the third pruning mask to include first values to identify a first plurality of pixels, a second plurality of pixels, and a third plurality of pixels to be kept and second values to identify a fourth plurality of pixels to be pruned, the fourth plurality of pixels including the third corresponding pixels that are included in the first corresponding pixels of the first view and the second corresponding pixels of the second view.

Example 8 includes the video encoder of example 7, further including a mask aggregator to aggregate the first pruning mask, the second pruning mask, and the third pruning mask.

Example 9 includes the video encoder of example 1, wherein the correspondence labeler is to identify the first unique pixels to be ones of the plurality of pixels of the first view that, when reprojected on the second view, do not project to locations of ones of the plurality of pixels of the second view.

Example 10 includes the video encoder of example 1, wherein the correspondence labeler is to identify the first corresponding pixels to be ones of the plurality of pixels of the first view that, when reprojected on the second view, project to locations of respective ones of the second corresponding pixels of the second view.

Example 11 includes the video encoder of example 10, wherein the correspondence labeler is to identify the first one of the first corresponding pixels and the second one of the second corresponding pixels as similar when a difference between their respective texture content in the first view and the second view satisfies a threshold.

Example 12 includes the video encoder of example 1, wherein the at least one atlas includes at least one of attribute maps or occupancy maps.

Example 13 includes the video encoder of example 1, wherein input views include attribute maps.

Example 14 includes the video encoder of example 1, wherein the encoded video data includes a flag to identify the at least one atlas does not include depth maps.

Example 15 includes At least one non-transitory computer readable medium comprising instructions which, when executed, cause one or more processors to at least identify first unique pixels and first corresponding pixels included in a plurality of pixels of a first view, identify second unique pixels and second corresponding pixels included in a plurality of pixels of a second view, ones of the first corresponding pixels having respective correspondence relationships with ones of the second corresponding pixels, a first one of the first corresponding pixels and a second one of the second corresponding pixels to be classified as having at least one of similar texture information or different texture information, compare adjacent pixels in the first view, identify a first patch of unique pixels and a second patch of corresponding pixels based on the comparison of the adjacent pixels and the correspondence relationships, the second patch tagged with a correspondence list identifying corresponding patches in the second view, and generate at least one atlas to include in encoded video data, the at least one atlas including the first patch of unique pixels and the second patch of corresponding pixels, the encoded video data not including depth maps.

Example 16 includes the at least one non-transitory computer readable medium of example 15, wherein the instructions cause the one or more processors to generate a first pruning mask for the first view, the first pruning mask based on texture information from the first unique pixels and the first corresponding pixels.

Example 17 includes the at least one non-transitory computer readable medium of example 16, wherein the first corresponding pixels do not include corresponding pixels included in a previous pruned view.

Example 18 includes the at least one non-transitory computer readable medium of any one of example 16 or example 17, wherein the instructions cause the one or more processors to generate a second pruning mask for the second view, the second pruning mask based on texture information from the second unique pixels and the second corresponding pixels.

Example 19 includes the at least one non-transitory computer readable medium of example 18, wherein the second corresponding pixels include corresponding pixels included in the first corresponding pixels of the first view.

Example 20 includes the at least one non-transitory computer readable medium of any one of example 18 or example 19, wherein the instructions cause the one or more processors to generate a third pruning mask for a third view, the third pruning mask based on texture information from third unique pixels and third corresponding pixels, the third corresponding pixels including corresponding pixels included in the first corresponding pixels of the first view and the second corresponding pixels of the second view.

Example 21 includes the at least one non-transitory computer readable medium of example 20, wherein the instructions cause the one or more processors to generate the first pruning mask, the second pruning mask, and the third pruning mask to include first values to identify a first plurality of pixels, a second plurality of pixels, and a third plurality of pixels to be kept and second values to identify a fourth plurality of pixels to be pruned, the fourth plurality of pixels including the third corresponding pixels that are included in the first corresponding pixels of the first view and second corresponding pixels of the second view.

Example 22 includes the at least one non-transitory computer readable medium of example 21, wherein the instructions cause the one or more processors to aggregate the first pruning mask, the second pruning mask, and the third pruning mask.

Example 23 includes the at least one non-transitory computer readable medium of example 15, wherein the instructions cause the one or more processors to identify the first unique pixels to be ones of the plurality of pixels of the first view that, when reprojected on the second view, do not project to locations of ones of the plurality of pixels of the second view.

Example 24 includes the at least one non-transitory computer readable medium of example 15, wherein the instructions cause the one or more processors to identify the first corresponding pixels to be ones of the plurality of pixels of the first view that, when reprojected on the second view, project to locations of respective ones of the second corresponding pixels of the second view.

Example 25 includes the at least one non-transitory computer readable medium of example 24, wherein the instructions cause the one or more processors to identify the first one of the first corresponding pixels and the second one of the second corresponding pixels as similar when a difference between their respective texture content in the first view and the second view satisfies a threshold.

Example 26 includes the at least one non-transitory computer readable medium of example 15, wherein the at least one atlas includes at least one of attribute maps or occupancy maps.

Example 27 includes the at least one non-transitory computer readable medium of example 15, wherein the encoded video data includes a flag to identify the at least one atlas does not include depth maps.

Example 28 includes a method comprising identifying first unique pixels and first corresponding pixels included in a plurality of pixels of a first view, identifying second unique pixels and second corresponding pixels included in a plurality of pixels of a second view, ones of the first corresponding pixels having respective correspondence relationships with ones of the second corresponding pixels, a first one of the first corresponding pixels and a second one of the second corresponding pixels to be classified as having at least one of similar texture information or different texture information, comparing adjacent pixels in the first view, identifying a first patch of unique pixels and a second patch of corresponding pixels based on the comparison of the adjacent pixels and the correspondence relationships, the second patch tagged with a correspondence list identifying corresponding patches in the second view, and generating at least one atlas to include in encoded video data, the at least one atlas including the first patch of unique pixels and the second patch of corresponding pixels, the encoded video data not including depth maps.

Example 29 includes the method of example 28, further including generating a first pruning mask for the first view, the first pruning mask based on texture information from the first unique pixels and the first corresponding pixels.

Example 30 includes the method of example 29, wherein the first corresponding pixels do not include corresponding pixels included in a previous pruned view.

Example 31 includes the method of any one of example 29 or example 30, further including generating a second pruning mask for the second view, the second pruning mask based on texture information from the second unique pixels and the second corresponding pixels.

Example 32 includes the method of example 31, wherein the second corresponding pixels include corresponding pixels included in the first corresponding pixels of the first view.

Example 33 includes the method of any one of example 31 or 32, further including generating a third pruning mask for a third view, the third pruning mask based on texture information from third unique pixels and third corresponding pixels, the third corresponding pixels including corresponding pixels included in the first corresponding pixels of the first view and the second corresponding pixels of the second view.

Example 34 includes the method of example 33, further including generating the first pruning mask, the second pruning mask, and the third pruning mask to include first values to identify a first plurality of pixels, a second plurality of pixels, and a third plurality of pixels to be kept and second values to identify a fourth plurality of pixels to be pruned, the fourth plurality of pixels including the third corresponding pixels that are included in the first corresponding pixels of the first view and second corresponding pixels of the second view.

Example 35 includes the method of example 34, further including aggregating the first pruning mask, the second pruning mask, and the third pruning mask.

Example 36 includes the method of example 28, further including identifying the first unique pixels to be ones of the plurality of pixels of the first view that, when reprojected on the second view, do not project to locations of ones of the plurality of pixels of the second view.

Example 37 includes the method of example 28, further including identifying the first corresponding pixels to be ones of the plurality of pixels of the first view that, when reprojected on the second view, project to locations of respective ones of the second corresponding pixels of the second view.

Example 38 includes the method of example 37, further including identifying the first one of the first corresponding pixels and the second one of the second corresponding pixels as similar when a difference between their respective texture content in the first view and the second view satisfies a threshold.

Example 39 includes the method of example 28, wherein the at least one atlas includes at least one of attribute maps or occupancy maps.

Example 40 includes the method of example 28, wherein the encoded video data includes a flag to identify the at least one atlas does not include depth maps.

Example 41 includes a video decoder, comprising a bitstream decoder to identify a flag in encoded video data, the flag to identify a first atlas and a second atlas that do not include depth maps, and decode the encoded video data to obtain (i) first metadata of a first view and (ii) second metadata of a second view, wherein patches from the first view and the second view belong to a same atlas or are distributed among different atlases, the first view including first patches within a first atlas and the second view including corresponding second patches within the first atlas or a second atlas tagged with a correspondence list, and a renderer to determine depth information based on comparison of pixels included in the first patches and corresponding pixels included in the corresponding second patches, and synthesize a target view from the determined depth information.

Example 42 includes the video decoder of example 41, wherein the first metadata includes a first map that maps blocks of pixels in the first view to the first patches included in the first view, and the second metadata includes a second map that maps blocks of pixels in the second view to the corresponding second patches included in the second view.

Example 43 includes the video decoder of example 42, wherein the renderer is to reconstruct the corresponding second patches based on the second map.

Example 44 includes the video decoder of example 41, wherein the renderer is to identify the corresponding pixels in the corresponding second patches based on the correspondence list from the encoded video data.

Example 45 includes the video decoder of any one of example 41 or 44, wherein the renderer is to determine the depth information based on a first one of the first patches from the first view and a respective one of the corresponding second patches from the second view determined to correspond with the first one of the first patches, wherein the respective one of the corresponding second patches has different texture information than the first one of the first patches or similar texture information to the first one of the first patches.

Example 46 includes At least one non-transitory computer readable medium comprising instructions which, when executed, cause one or more processors to at least identify a flag in encoded video data, the flag to identify a first atlas and a second atlas that do not include depth maps, decode the encoded video data to obtain (i) first metadata of a first view and (ii) second metadata of a second view, wherein patches from the first view and the second view belong to a same atlas or are distributed among different atlases, the first view including first patches within a first atlas and the second view including corresponding second patches within the first atlas or a second atlas tagged with a correspondence list, determine depth information based on comparison of pixels included in the first patches and corresponding second pixels included in the corresponding second patches, and synthesize a target view from the determined depth information.

Example 47 includes the at least one non-transitory computer readable medium of example 46, wherein the first metadata includes a first map that maps blocks of pixels in the first view to the first patches included in the first view, and the second metadata includes a second map that maps blocks of pixels in the second view to the corresponding second patches included in the second view.

Example 48 includes the at least one non-transitory computer readable medium of example 47, wherein the instructions cause the one or more processors to reconstruct the corresponding second patches based on the second map.

Example 49 includes the at least one non-transitory computer readable medium of example 46, wherein the instructions cause the one or more processors to identify the corresponding second pixels in the corresponding second patches based on the correspondence list from the encoded video data.

Example 50 includes the at least one non-transitory computer readable medium of any one of example 46 or 49, wherein the instructions cause the one or more processors to determine the depth information based on a first one of the first patches from the first view and a respective one of the corresponding second patches from the second view determined to correspond with the first one of the first patches, wherein the respective one of the corresponding second patches has different texture information than the first one of the first patches or similar texture information to the first one of the first patches.

Example 51 includes a method, comprising identifying a flag in encoded video data, the flag to identify a first atlas and a second atlas that do not include depth maps, decoding the encoded video data to obtain (i) first metadata of a first view and (ii) second metadata of a second view, wherein patches from the first view and the second view belong to a same atlas or are distributed among different atlases, the first view including first patches within a first atlas and the second view including corresponding second patches within the first atlas or a second atlas tagged with a correspondence list, determining depth information based on comparison of pixels included in the first patches and corresponding second pixels included in the corresponding second patches, and synthesizing a target view from the determined depth information.

Example 52 includes the method of example 51, wherein the first metadata includes a first map that maps blocks of pixels in the first view to the first patches included in the first view, and the second metadata includes a second map that maps blocks of pixels in the second view to the corresponding second patches included in the second view.

Example 53 includes the method of example 52, further including reconstructing the corresponding second patches based on the second map.

Example 54 includes the method of example 51, further including identifying the corresponding second pixels in the corresponding second patches based on the correspondence list from the encoded video data.

Example 55 includes the method of any one of example 51 or example 54, further including determining the depth information based on a first one of the first patches from the first view and a respective one of the corresponding second patches from the second view determined to correspond with the first one of the first patches, wherein the respective one of the corresponding second patches has different texture information than the first one of the first patches or similar texture information to the first one of the first patches.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A video encoder comprising:
a correspondence labeler to (i) identify first unique pixels and first corresponding pixels included in a plurality of pixels of a first view and (ii) identify second unique pixels and second corresponding pixels included in a plurality of pixels of a second view, ones of the first corresponding pixels having respective correspondence relationships with ones of the second corresponding pixels, a first one of the first corresponding pixels and a second one of the second corresponding pixels to be classified as having at least one of similar texture information or different texture information;
a correspondence patch packer to (i) compare adjacent pixels in the first view and (ii) identify a first patch of unique pixels and a second patch of corresponding pixels based on the comparison of the adjacent pixels and the correspondence relationships, the second patch tagged with a correspondence list identifying corresponding patches in the second view; and
an atlas generator to generate at least one atlas to include in encoded video data, the at least one atlas including the first patch of unique pixels and the second patch of corresponding pixels, the encoded video data not including depth maps.

2. The video encoder of claim 1, further including a correspondence pruner to generate a first pruning mask for the first view, the first pruning mask based on texture information from the first unique pixels and the first corresponding pixels.

3. The video encoder of claim 2, wherein the first corresponding pixels do not include corresponding pixels included in a previous pruned view.

4. The video encoder of claim 2, wherein the correspondence pruner is to generate a second pruning mask for the second view, the second pruning mask based on texture information from the second unique pixels and the second corresponding pixels.

5. The video encoder of claim 4, wherein the correspondence pruner is to generate a third pruning mask for a third view, the third pruning mask based on texture information from third unique pixels and third corresponding pixels, the third corresponding pixels including corresponding pixels included in the first corresponding pixels of the first view and second corresponding pixels of the second view.

6. The video encoder of claim 5, wherein the correspondence pruner is to generate the first pruning mask, the second pruning mask, and the third pruning mask to include first values to identify a first plurality of pixels, a second plurality of pixels, and a third plurality of pixels to be kept and second values to identify a fourth plurality of pixels to be pruned, the fourth plurality of pixels including the third corresponding pixels that are included in the first corresponding pixels of the first view and the second corresponding pixels of the second view.

7. The video encoder of claim 6, further including a mask aggregator to aggregate the first pruning mask, the second pruning mask, and the third pruning mask.

8. The video encoder of claim 1, wherein the correspondence labeler is to identify the first unique pixels to be ones of the plurality of pixels of the first view that, when reprojected on the second view, do not project to locations of ones of the plurality of pixels of the second view.

9. The video encoder of claim 1, wherein the correspondence labeler is to
identify the first corresponding pixels to be ones of the plurality of pixels of the first view that, when reprojected on the second view, project to locations of respective ones of the second corresponding pixels of the second view; and
identify the first one of the first corresponding pixels and the second one of the second corresponding pixels as similar when a difference between their respective texture content in the first view and the second view satisfies a threshold.

10. At least one non-transitory computer readable medium comprising instructions which, when executed, cause one or more processors to at least:
identify first unique pixels and first corresponding pixels included in a plurality of pixels of a first view;
identify second unique pixels and second corresponding pixels included in a plurality of pixels of a second view, ones of the first corresponding pixels having respective correspondence relationships with ones of the second corresponding pixels, a first one of the first corresponding pixels and a second one of the second corresponding pixels to be classified as having at least one of similar texture information or different texture information;
compare adjacent pixels in the first view;
identify a first patch of unique pixels and a second patch of corresponding pixels based on the comparison of the adjacent pixels and the correspondence relationships, the second patch tagged with a correspondence list identifying corresponding patches in the second view; and
generate at least one atlas to include in encoded video data, the at least one atlas including the first patch of unique pixels and the second patch of corresponding pixels, the encoded video data not including depth maps.

11. The at least one non-transitory computer readable medium of claim 10, wherein the instructions cause the one or more processors to generate a first pruning mask for the first view, the first pruning mask based on texture information from the first unique pixels and the first corresponding pixels.

12. The at least one non-transitory computer readable medium of claim 11, wherein the first corresponding pixels do not include corresponding pixels included in a previous pruned view.

13. The at least one non-transitory computer readable medium of claim 11, wherein the instructions cause the one or more processors to generate a second pruning mask for the second view, the second pruning mask based on texture information from the second unique pixels and the second corresponding pixels.

14. The at least one non-transitory computer readable medium of claim 13, wherein the second corresponding pixels include corresponding pixels included in the first corresponding pixels of the first view.

15. The at least one non-transitory computer readable medium of claim 13, wherein the instructions cause the one or more processors to generate a third pruning mask for a third view, the third pruning mask based on texture information from third unique pixels and third corresponding pixels, the third corresponding pixels including corresponding pixels included in the first corresponding pixels of the first view and the second corresponding pixels of the second view.

16. The at least one non-transitory computer readable medium of claim 15, wherein the instructions cause the one or more processors to generate the first pruning mask, the second pruning mask, and the third pruning mask to include first values to identify a first plurality of pixels, a second plurality of pixels, and a third plurality of pixels to be kept and second values to identify a fourth plurality of pixels to be pruned, the fourth plurality of pixels including the third corresponding pixels that are included in the first corresponding pixels of the first view and second corresponding pixels of the second view.

17. The at least one non-transitory computer readable medium of claim 16, wherein the instructions cause the one or more processors to aggregate the first pruning mask, the second pruning mask, and the third pruning mask.

18. The at least one non-transitory computer readable medium of claim 10, wherein the instructions cause the one or more processors to identify the first unique pixels to be ones of the plurality of pixels of the first view that, when reprojected on the second view, do not project to locations of ones of the plurality of pixels of the second view.

19. The at least one non-transitory computer readable medium of claim 10, wherein the instructions cause the one or more processors to identify the first corresponding pixels to be ones of the plurality of pixels of the first view that, when reprojected on the second view, project to locations of respective ones of the second corresponding pixels of the second view.

20. The at least one non-transitory computer readable medium of claim 19, wherein the instructions cause the one or more processors to identify the first one of the first corresponding pixels and the second one of the second corresponding pixels as similar when a difference between their respective texture content in the first view and the second view satisfies a threshold.

21. A system, comprising:
at least one memory;
machine readable instructions; and
processor circuitry to at least one of instantiate or execute the machine readable instructions to:
identify a flag in encoded video data, the flag to identify a first atlas and a second atlas that do not include depth maps;
decode the encoded video data to obtain (i) first metadata of a first view and (ii) second metadata of a second view, wherein patches from the first view and the second view belong to a same atlas or are distributed among different atlases, the first view including first patches within a first atlas and the second view including corresponding second patches within the first atlas or a second atlas tagged with a correspondence list;

determine depth information based on comparison of pixels included in the first patches and corresponding second pixels included in the corresponding second patches; and synthesize a target view from the determined depth information.

22. The system of claim 21, wherein the first metadata includes a first map that maps blocks of pixels in the first view to the first patches included in the first view, and the second metadata includes a second map that maps blocks of pixels in the second view to the corresponding second patches included in the second view.

23. The system of claim 22, wherein the instructions cause the processor circuitry to at least one of instantiate or execute the machine readable instructions to reconstruct the corresponding second patches based on the second map.

24. The system of claim 21, wherein the instructions cause the processor circuitry to at least one of instantiate or execute the machine readable instructions to identify the corresponding second pixels in the corresponding second patches based on the correspondence list from the encoded video data.

25. The system of claim 21, wherein the instructions cause the processor circuitry to at least one of instantiate or execute the machine readable instructions to determine the depth information based on a first one of the first patches from the first view and a respective one of the corresponding second patches from the second view determined to correspond with the first one of the first patches, wherein the respective one of the corresponding second patches has different texture information than the first one of the first patches or similar texture information to the first one of the first patches.

* * * * *